US009493231B2

(12) United States Patent
Matsui

(10) Patent No.: US 9,493,231 B2
(45) Date of Patent: Nov. 15, 2016

(54) FLIGHT CONTROL SYSTEM COMMAND SELECTION AND DATA TRANSPORT

(71) Applicant: The Boeing Company, Chicago, IL (US)

(72) Inventor: Gen Matsui, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/664,355

(22) Filed: Mar. 20, 2015

(65) Prior Publication Data

US 2016/0272300 A1 Sep. 22, 2016

(51) Int. Cl.
*G01C 23/00* (2006.01)
*B64C 13/18* (2006.01)
*B64C 13/50* (2006.01)

(52) U.S. Cl.
CPC .................. *B64C 13/503* (2013.01)

(58) Field of Classification Search
USPC .............................................. 701/3; 244/175
See application file for complete search history.

(56) References Cited

U.S. PATENT DOCUMENTS

| | | | | |
|---|---|---|---|---|
| 8,601,150 B1* | 12/2013 | Portell | .................. | G06F 15/163 709/234 |
| 8,805,600 B2* | 8/2014 | Sghairi | .................. | B64C 13/503 701/11 |
| 2004/0017817 A1* | 1/2004 | Jameson | .................. | H04L 67/10 370/400 |
| 2007/0033195 A1* | 2/2007 | Stange | ............... | G05B 23/0213 |
| 2007/0033435 A1* | 2/2007 | Stange | ..................... | G05B 9/03 714/15 |
| 2007/0164166 A1* | 7/2007 | Hirvonen | ................ | B64C 13/42 244/175 |
| 2007/0164168 A1* | 7/2007 | Hirvonen | ................ | B64C 13/04 244/223 |
| 2007/0233330 A1* | 10/2007 | Beutler | ................ | G05D 1/0077 701/3 |
| 2009/0152404 A1* | 6/2009 | Yount | .................. | G05D 1/0061 244/194 |
| 2011/0066305 A1* | 3/2011 | Lin | ........................ | B64C 13/503 701/3 |
| 2011/0118906 A1* | 5/2011 | Fervel | ................... | B64C 13/503 701/3 |

OTHER PUBLICATIONS

Matsui, "Electronic Stopper in Actuator Control," U.S. Appl. No. 14/448,134, filed Jul. 31, 2014, 140 pages.

* cited by examiner

*Primary Examiner* — Thomas G Black
*Assistant Examiner* — Tyler Paige
(74) *Attorney, Agent, or Firm* — Yee & Associates, P.C.

(57) ABSTRACT

An apparatus and method for controlling an actuator. A plurality of commands for the actuator are received from a number of primary controllers by a command lane and a monitor lane. The command lane selects a first selected number of commands from the plurality of commands using a selection rule. The monitor lane selects a second selected number of commands from the plurality of commands using the selection rule and generates a check value for the second selected number of commands. The first selected number of commands from the command lane and the check value from the monitor lane are combined to form an actuator control command message comprising the first selected number of commands and the check value. The actuator control command message is sent to an actuator controller for controlling the actuator.

20 Claims, 19 Drawing Sheets

FLIGHT CONTROL SYSTEM COMMAND SELECTION AND DATA TRANSPORT

BACKGROUND INFORMATION

1. Field

The present disclosure relates generally to flight control systems for aircraft. More particularly, the present disclosure relates to a method and apparatus for selecting and transporting commands from primary controllers to actuator controllers for controlling actuators on an aircraft or other vehicle and for transporting reporting data from the actuator controllers back to the primary controllers.

2. Background

Actuator commands in a fly-by-wire flight control system for an aircraft may comprise, for example, position commands, rate commands, and operation mode commands. In a full-authority fly-by-wire flight control system, multiple flight controllers may be used to provide redundant sources of actuator control commands to ensure their high availability. In such a case, a selection of the actuator commands that will be used to control actuators on the aircraft needs to be made from the commands provided my multiple redundant sources. The selected set of commands then needs to be distributed to the appropriate actuators. For example, there may be primary sources of actuator control commands from which a selection is ordinarily made and a dissimilar backup source of actuator control commands which is selected only in the case of loss of all primary sources.

It also may be desirable for the flight controllers on an aircraft to be able to turn the electrical power to individual actuator controllers on and off in parallel with the actuator control commands. In addition, it may be desirable to transport reporting data from remote actuators back to the primary flight controllers on an aircraft.

Thus, it would be desirable to have a method and apparatus that take into account one or more of the issues discussed above, as well as possible other issues.

SUMMARY

An illustrative embodiment provides an apparatus comprising a command lane, a monitor lane, and a command combiner. The command lane is configured to receive a plurality of commands for an actuator from a number of primary controllers and select a first selected number of commands from the plurality of commands using a selection rule. The monitor lane is configured to receive the plurality of commands from the number of primary controllers, select a second selected number of commands from the plurality of commands using the selection rule, and generate a check value for the second selected number of commands. The command combiner is configured to combine the first selected number of commands from the command lane and the check value from the monitor lane to form an actuator control command message comprising the first selected number of commands and the check value and to send the actuator control command message to an actuator controller for controlling the actuator.

An illustrative embodiment also provides a method for controlling an actuator. A plurality of commands for the actuator are received from a number of primary controllers by a command lane and a monitor lane. The command lane selects a first selected number of commands from the plurality of commands using a selection rule. The monitor lane selects a second selected number of commands from the plurality of commands using the selection rule and generates a check value for the second selected number of commands. The first selected number of commands from the command lane and the check value from the monitor lane are combined to form an actuator control command message comprising the first selected number of commands and the check value. The actuator control command message is sent to an actuator controller for controlling the actuator.

An illustrative embodiment also provides another method of controlling an actuator. An actuator control command message comprising a first selected number of commands from a command lane and a check value for the first selected number of commands generated by a monitor lane is received. Validity of the actuator control command message is determined using the first selected number of commands from the command lane and the check value from the monitor lane. The actuator is controlled as indicated by the first selected number of commands in response to a determination that the actuator control command message is valid.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the disclosure are set forth in the appended claims. The disclosure itself, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Different illustrative embodiments recognize and take into account a number of different considerations. "A number," as used herein with reference to items, means one or more items. For example, "a number of different considerations" are one or more different considerations.

The different illustrative embodiments recognize and take into account that it is desirable that the functionalities and data paths for providing commands from primary controllers to remote actuator controllers are of the highest integrity, so that no data corruption will go undetected. At the same time, the system as a whole must be robust. In other words, it may be desirable that the system is tolerant to the occurrence of data corruption and is able to provide a high level of control following such events.

The different illustrative embodiments recognize and take into account that a system that monitors data paths very tightly may be able to provide high integrity. However, such a system would not be considered robust if these monitors need to be designed to trip off too easily to cause system components to be frequently shut down.

The illustrative embodiments achieve the objectives of high integrity and high robustness by blocking malfunction effects from ever reaching the actuators. By blocking the effect of malfunctions from the actuators, high-integrity is maintained. Because the actuators do not respond to the malfunctions, monitoring in the system may be relaxed, thereby achieving high robustness. The malfunctions of concern are those corrupting data paths to and from the actuators as well as power control paths.

Figure 1:
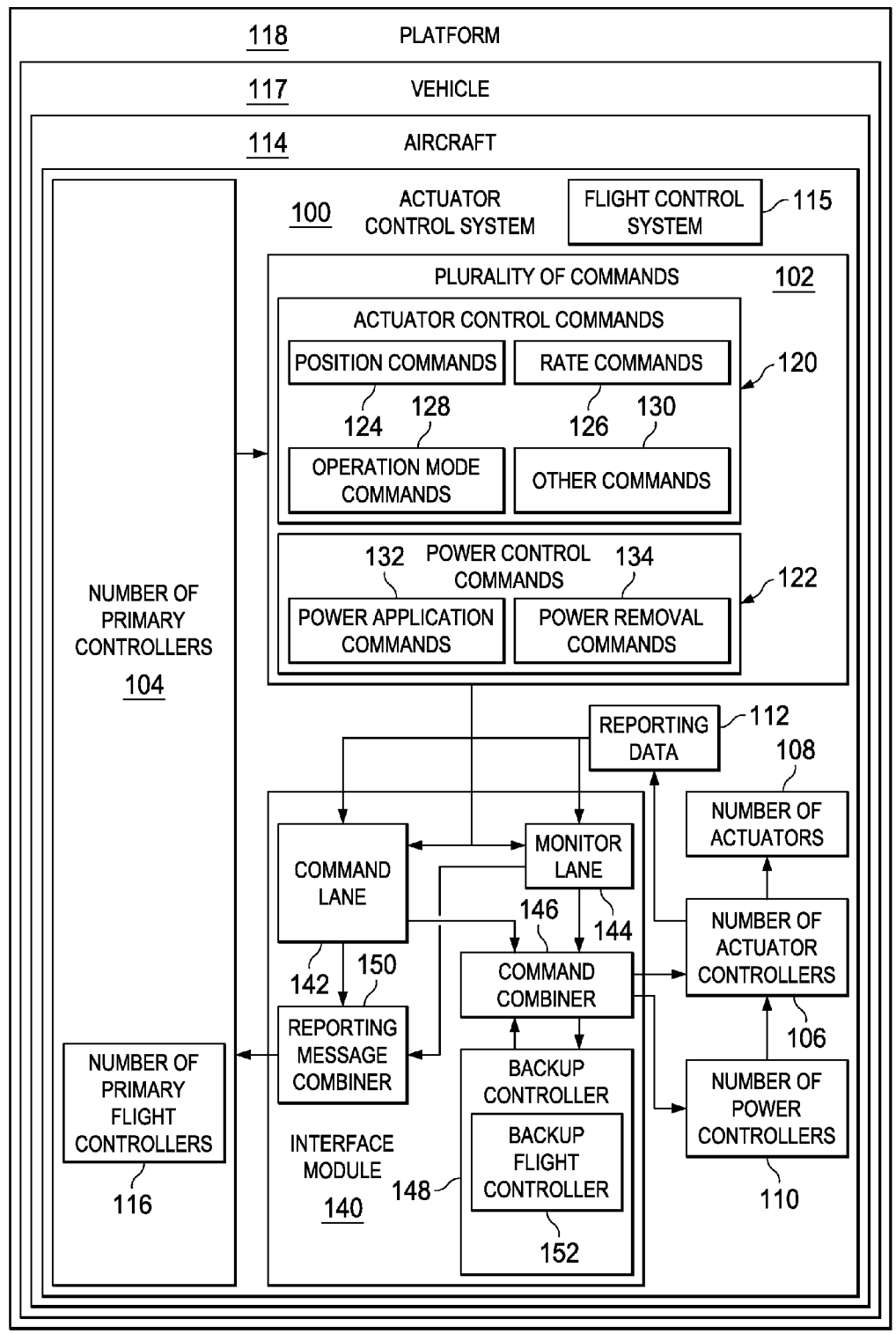
FIG. 1 is an illustration of a block diagram of an actuator control system in accordance with an illustrative embodiment.

Turning to FIG. 1, an illustration of a block diagram of an actuator control system is depicted in accordance with an illustrative embodiment. Actuator control system 100 is configured to select and deliver selected ones of plurality of commands 102 from number of primary controllers 104 to number of actuator controllers 106 for controlling number of actuators 108. Actuator control system 100 also may be configured to select and deliver selected ones of plurality of commands 102 from number of primary controllers 104 to number of power controllers 110 for controlling the providing of electrical power to number of actuator controllers 106. Actuator control system 100 also may be configured to transport reporting data 112 from number of actuator controllers 106 back to number of primary controllers 104.

Actuator control system 100 may be configured to provide control and data reporting for number of actuators 108 on aircraft 114. For example, without limitation, number of actuators 108 may be configured to move flight control surfaces or to perform other appropriate functions on aircraft 114. In this case, actuator control system 100 may comprise flight control system 115 and number of primary controllers 104 may comprise number of primary flight controllers 116.

Aircraft 114 may be a commercial passenger aircraft, a cargo aircraft, a private or personal aviation aircraft, a military aircraft, or any other appropriate type of aircraft that may be used for any appropriate purpose. Aircraft 114 may be a fixed wing, a rotary wing, or lighter-than-air aircraft. Aircraft 114 may comprise a manned aircraft or an unmanned aerial vehicle.

Aircraft 114 is an example of vehicle 117. The illustrative embodiments may be used to control and provide reporting data transport for number of actuators 108 on vehicle 117 other than aircraft 114. Vehicle 117 may comprise any vehicle configured for operation in the air, in space, on land, on water, under water, or in any other medium or combinations of media.

Vehicle 117 is an example of platform 118. The illustrative embodiments may be used to control and provide reporting data transport for number of actuators 108 on platform 118 other than vehicle 117. Platform 118 may be fixed or mobile.

Plurality of commands 102 may be generated or otherwise provided by number of primary controllers 104. Plurality of commands 102 may include actuator control commands 120 and power control commands 122.

Actuator control commands 120 may comprise any appropriate commands indicating a desired position, movement, state, or other condition of number of actuators 108. For example, without limitation, actuator control commands 120 may comprise position commands 124, rate commands 126, operation mode commands 128, other commands 130, or various combinations of commands identifying a desired position, movement, state or operation, or other condition of number of actuators 108.

Power control commands 122 may indicate whether power is to be provided to number of actuator controllers 106 by number of power controllers 110, whether power is to be removed from number of actuator controllers 106 by number of power controllers 110, or both. For example, without limitation, power control commands 122 may include power application commands 132, power removal commands 134, or both. Power application commands 132 may indicate that power is to be provided to number of actuator controllers 106 by number of power controllers 110. Power removal commands 134 may indicate that power is to be removed from number of actuator controllers 106 by number of power controllers 110.

In accordance with an illustrative embodiment, plurality of commands 102 may be sent from number of primary controllers 104 to number of actuator controllers 106 and number of power controllers 110 via interface module 140. Reporting data 112 may be sent from number of actuator controllers 106 to number of primary controllers 104 via interface module 140. Interface module 140 may comprise command lane 142, monitor lane 144, command combiner 146, backup controller 148, and reporting message combiner 150.

Command lane 142 and monitor lane 144 both may receive plurality of commands 102 from number of primary controllers 104 and both may select commands from plurality of commands 102 to send to number of actuator controllers 106 using the same rule. Monitor lane 144 may also generate a check value for the selected commands. Command combiner 146 may combine the commands selected by command lane 142 with the check value generated by monitor lane 144 to provide a command message to number of actuator controllers 106. Number of actuator controllers 106 may use the check value to validate the command message before controlling number of actuator controllers 106 in accordance with the commands received. Command combiner 146 also may send an appropriate power control command selected by command lane 142 and monitor lane 144 to number of power controllers 110.

Backup controller 148 may receive the commands selected from plurality of commands 102 by command lane 142. Backup controller 148 may generate backup actuator control commands and power commands in response to a determination that a backup mode is desirable. Command combiner 146 may direct the appropriate backup commands from backup controller 148 to number of actuator controllers 106 and number of power controllers 110 in response to the determination that a backup mode is desired. In the case where actuator control system 100 comprises flight control system 115 on aircraft 114, backup controller 148 may be backup flight controller 152.

Command lane 142 and monitor lane 144 both may receive reporting data 112 from number of actuator controllers 106 and both may add the same additional data to reporting data 112. Monitor lane 144 may also generate a check value for the reporting data 112 and additional data. Reporting message combiner 150 may combine reporting data 112 and other data from command lane 142 with the check value for reporting data 112 and other data generated by monitor lane 144 to provide a reporting message to number of primary controllers 104. Number of primary controllers 104 may use the check value to validate the reporting message before using reporting data 112 and other data in the reporting message for any appropriate purpose.

Figure 2:
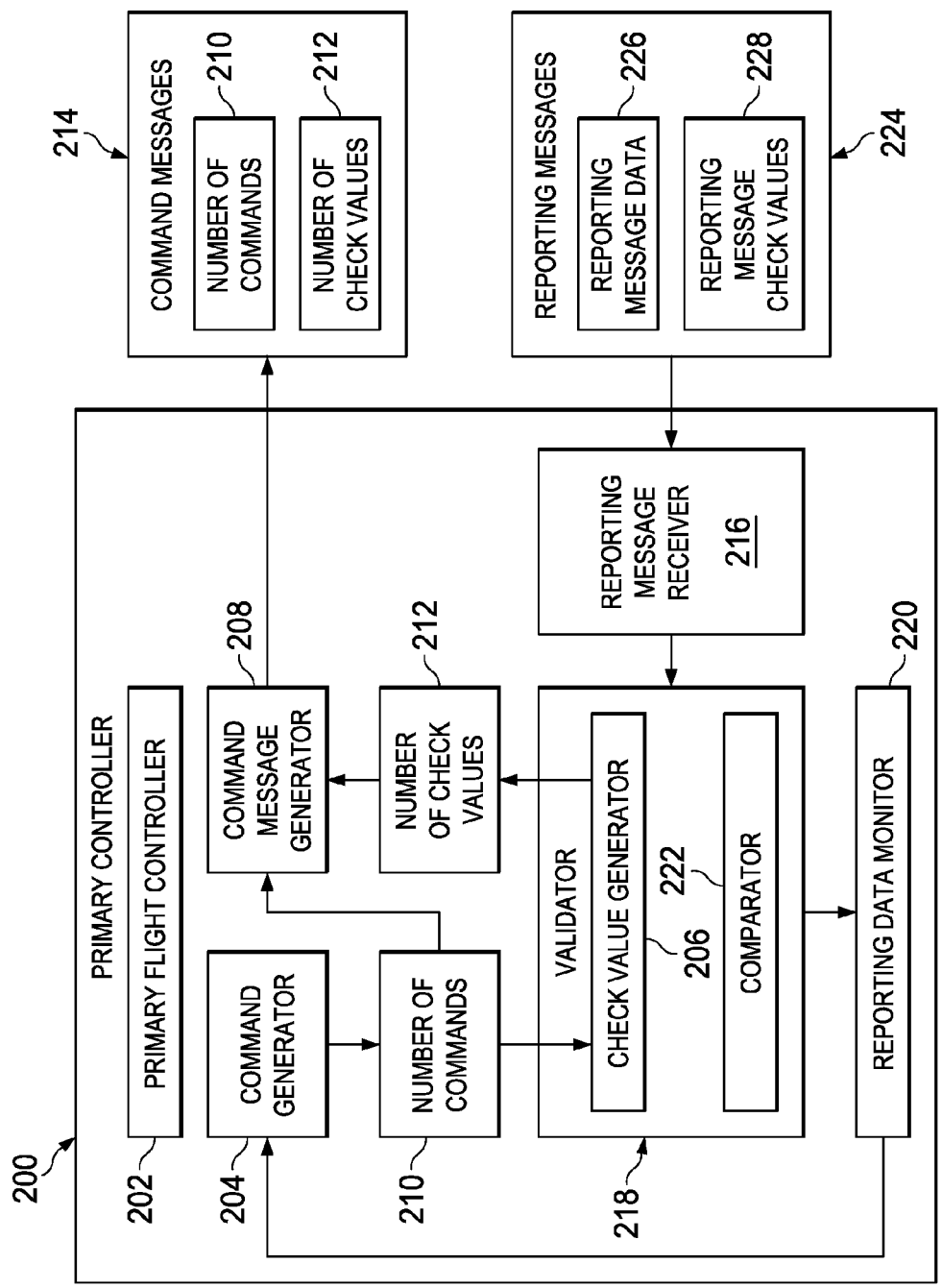
FIG. 2 is an illustration of a block diagram of a primary controller in accordance with an illustrative embodiment.

Turning now to FIG. 2, an illustration of a block diagram of a primary controller is depicted in accordance with an illustrative embodiment. Primary controller 200 may be an example of one implementation of number of primary controllers 104 in FIG. 1. For example, without limitation, primary controller 200 may comprise primary flight controller 202 on an aircraft.

Primary controller 200 may comprise command generator 204, check value generator 206, and command message generator 208. Command generator 204 may generate number of commands 210. Check value generator 206 may generate number of check values 212 for number of commands 210. For example, without limitation, number of check values 212 may comprise values for a cyclic redundancy check or for any other appropriate method of error detection. Command message generator 208 may combine number of commands 210 and number of check values 212 in an appropriate manner to form command messages 214.

Primary controller 200 also may comprise reporting message receiver 216, validator 218, and reporting data monitor 220. Validator 218 may comprise check value generator 206 and comparator 222. A different or the same check value generator 206 may be used in validator 218 and to generate number of check values 212.

Reporting message receiver 216 may be configured to receive reporting messages 224 comprising reporting message data 226 and reporting message check values 228. Validator 218 may determine whether reporting messages 224 are valid by generating a check value for reporting message data 226 using check value generator 206 and using comparator 222 to compare the generated check value to reporting message check values 228. Reporting messages 224 may be determined to be valid when the check value generated by check value generator 206 matches reporting message check values 228. Reporting message data 226 in reporting messages 224 determined to be valid may be used by primary controller 200 in any appropriate manner.

Reporting data monitor 220 may monitor reporting messages 224 for validity and freshness. For example, without limitation, reporting data monitor 220 may trip when reporting messages 224 from a particular actuator controller are determined not to be valid for a finite duration or if a significant portion of reporting messages 224 from the actuator controller are not valid. Reporting data monitor 220 also may trip when there is no new reporting messages 224 from a particular actuator controller for a finite duration or a significant portion of reporting messages 224 from the actuator controller are missing. When reporting data monitor 220 trips, primary controller 200 may generate and send command messages 214 to remove power from the affected actuator controller and to command the affected actuator controller to passivate the relevant actuator.

Figure 3:
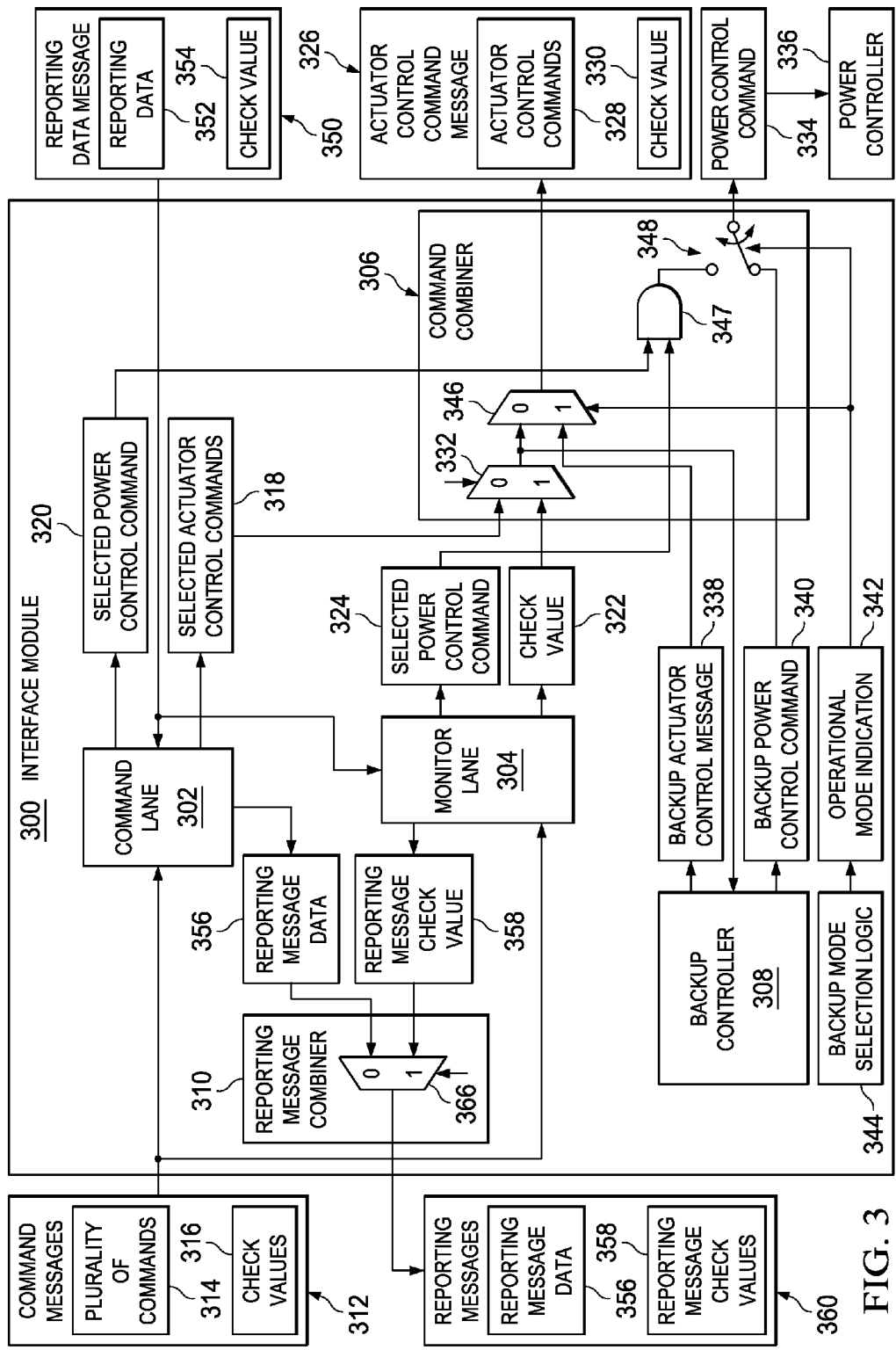
FIG. 3 is an illustration of a block diagram of an interface module in accordance with an illustrative embodiment.

Turning to FIG. 3, an illustration of a block diagram of an interface module is depicted in accordance with an illustrative embodiment. Interface module 300 may be an example of one implementation of interface module 140 in FIG. 1. Interface module 300 may comprise command lane 302, monitor lane 304, command combiner 306, backup controller 308, and reporting message combiner 310.

Command messages 312 from a primary controller may comprise plurality of commands 314 and check values 316. Command messages 312 may be an example of one implementation of command messages 214 from primary controller 200 in FIG. 2.

Command messages 312 may be provided to both command lane 302 and monitor lane 304. Command lane 302 may select selected actuator control commands 318 and selected power control command 320 from plurality of commands 314 in command messages 312. Selected power control command 320 may be referred to as a first selected power control command. Operating independently, monitor lane 304 may generate check value 322 for selected actuator control commands 318 and may select selected power control command 324 from plurality of commands 314 in command messages 312. Selected power control command 324 may be referred to as a second selected power control command.

Command combiner 306 may combine selected actuator control commands 318 from command lane 302 and check value 322 from monitor lane 304 to form actuator control command message 326 comprising actuator control commands 328 and check value 330 for actuator control commands 328. For example, without limitation, command combiner 306 may comprise multiplexer 332 for combining selected actuator control commands 318 and check value 322 to form actuator control command message 326.

Command combiner 306 also may provide power control command 334 for power controller 336 by appropriately combining selected power control command 320 from command lane 302 and selected power control command 324 from monitor lane 304. In this example, command combiner 306 comprises AND logic 347 that is configured to provide power control command 334 to power controller 336 to provide power to an actuator controller when both selected power control command 320 and selected power control command 324 are power application commands indicating that power should be provided to the actuator controller.

Backup controller 308 may receive selected actuator control commands 318 from command lane 302 and check value 322 from monitor lane 304. Backup controller 308 also may generate backup actuator control message 338 and backup power control command 340. During primary mode operation, backup actuator control message 338 may include actuator control commands that are the same as selected actuator control commands 318 received from command lane 302.

Command combiner 306 may select backup actuator control message 338 to provide as actuator control command message 326 when operational mode indication 342 provided by backup mode selection logic 344 indicates a backup mode. For example, without limitation, command combiner 306 may comprise multiplexer 346 for selecting backup actuator control message 338 when operational mode indication 342 indicates the backup mode.

When backup mode selection logic 344 incorrectly indicates the backup mode, selected actuator control commands 318 provided from backup controller 308 in backup actuator control message 338 may continue to be provided as actuator control commands 328 in actuator control command message 326. In this case, actuator control commands 328 provided to an actuator controller are not affected by an incorrect indication of the backup mode by operational mode indication 342.

Command combiner 306 may select backup power control command 340 to provide as power control command 334 when operational mode indication 342 provided by backup mode selection logic 344 indicates the backup mode. For example, without limitation, command combiner 306 may comprise switch 348 for selecting backup power control command 340 when operational mode indication 342 indicates the backup mode. Switch 348 may be implemented in any appropriate manner.

Reporting data message 350 comprising reporting data 352 and check value 354 may be provided from an actuator controller to command lane 302 and monitor lane 304. Command lane 302 may provide reporting message data 356 comprising reporting data 352. Monitor lane 304 may generate reporting message check value 358 for reporting message data 356.

Reporting message combiner 310 may combine reporting message data 356 from command lane 302 and reporting message check value 358 from monitor lane 304 to form reporting messages 360 comprising reporting message data 356 and reporting message check value 358 for reporting message data 356. For example, without limitation, reporting message combiner 310 may comprise multiplexer 366 for combining reporting message data 356 and reporting message check value 358 to form reporting messages 360.

Figure 4:
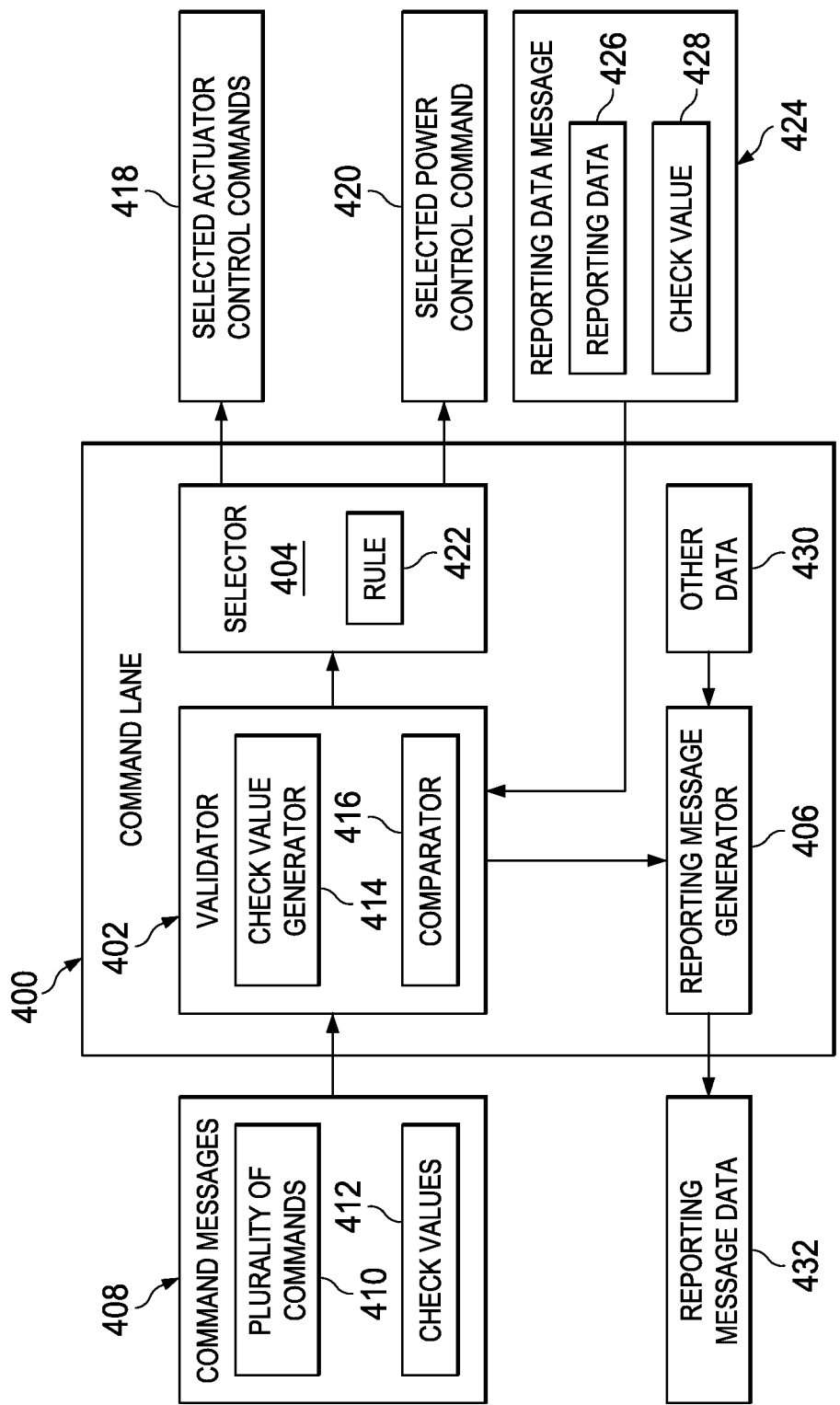
FIG. 4 is an illustration of a block diagram of a command lane in accordance with an illustrative embodiment.

Turning to FIG. 4, an illustration of a block diagram of a command lane is depicted in accordance with an illustrative embodiment. Command lane 400 may be an example of one implementation of command lane 142 in FIG. 1 and command lane 302 in FIG. 3. Command lane 400 comprises validator 402, selector 404, and reporting message generator 406.

Validator 402 is configured to validate command messages 408 comprising plurality of commands 410 and check values 412. Validator 402 may comprise check value generator 414 and comparator 416. Check value generator 414 generates a check value for plurality of commands 410. Comparator 416 compares the check value generated by check value generator 414 to check values 412 in command messages 408. Command messages 408 are valid when the check value generated by check value generator 414 matches check values 412 in command messages 408.

Selector 404 is configured to select selected actuator control commands 418 and selected power control command 420 from plurality of commands 410 using rule 422. Rule 422 may define any appropriate selection method. For example, without limitation, rule 422 may define a mid-value selection for continuous parameters or a majority vote selection for discrete parameters.

Validator 402 also may be used to validate reporting data message 424 comprising reporting data 426 and check value 428 received from an actuator controller. In this case, check value generator 414 may generate a check value for reporting data 426. Comparator 416 compares the check value generated by check value generator 414 to check value 428 in reporting data message 424. Reporting data message 424 is valid when the check value generated by check value generator 414 matches check value 428 in reporting data message 424. Reporting data 426 from reporting data message 424 that is determined to be valid may be combined with other data 430 by reporting message generator 406 to provide reporting message data 432.

Reporting data message 424 may not be validated by command lane 400 when reporting data message 424 including check value 428 will be embedded in a reporting message sent from an interface module to a primary controller. In this case, validation of reporting data message 424 may be performed by the primary controller.

Figure 5:
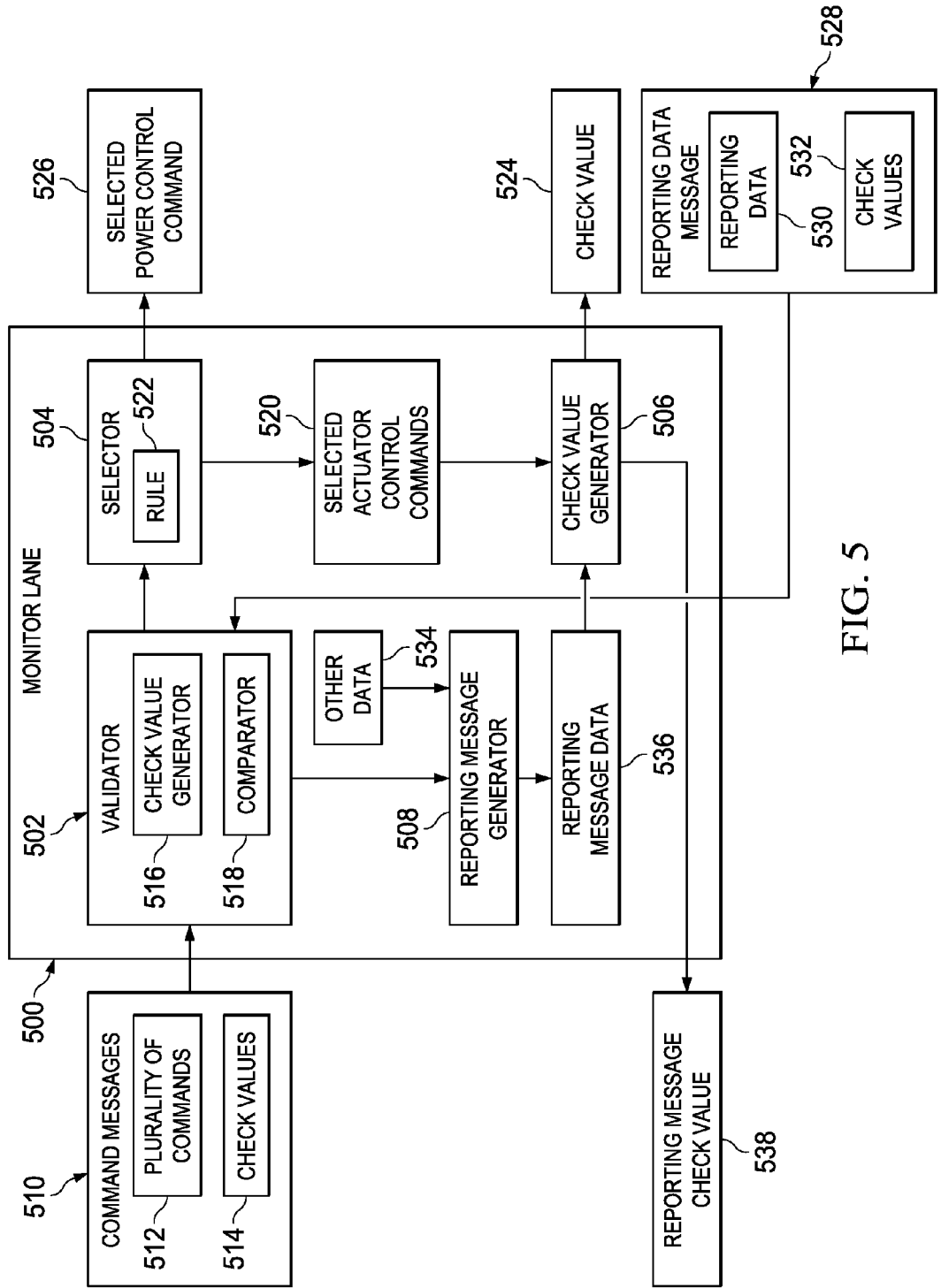
FIG. 5 is an illustration of a block diagram of a monitor lane in accordance with an illustrative embodiment.

Turning to FIG. 5, an illustration of a block diagram of a monitor lane is depicted in accordance with an illustrative embodiment. Monitor lane 500 may be an example of one implementation of monitor lane 144 in FIG. 1 and monitor lane 304 in FIG. 3. Monitor lane 500 may comprise validator 502, selector 504, check value generator 506, and reporting message generator 508.

Validator 502 may be configured to validate command messages 510 comprising plurality of commands 512 and check values 514. Validator 502 may comprise check value generator 516 and comparator 518. Check value generator 516 generates a check value for plurality of commands 512. Comparator 518 compares the check value generated by check value generator 516 to check values 514 in command messages 510. Command messages 510 are valid when the check value generated by check value generator 516 in validator 502 matches check values 514 in command messages 510.

Selector 504 may be configured to select selected actuator control commands 520 and selected power control command 526 from plurality of commands 512 using rule 522. Rule 522 may define any appropriate selection method. However, rule 522 must be the same as rule 422 that is used to define the selection made by selector 404 in command lane 400 in FIG. 4. Check value generator 506 may be used to generate check value 524 for selected actuator control commands 520.

Validator 502 also may be used to validate reporting data message 528 comprising reporting data 530 and check value 532 received from an actuator controller. In this case, check value generator 516 may generate a check value for reporting data 530. Comparator 518 compares the check value generated by check value generator 516 to check value 532 in reporting data message 528. Reporting data message 528 is valid when the check value generated by check value generator 516 matches check value 532 in reporting data message 528.

Reporting data 530 from reporting data message 528 that is determined to be valid may be combined with other data 534 by reporting message generator 508 to provide reporting message data 536. Check value generator 506 may be used to generate reporting message check value 538 for reporting message data 536.

Reporting data message 528 may not be validated by monitor lane 500 when reporting data message 528 including check value 532 will be embedded in a reporting message sent from an interface module to a primary controller. In this case, validation of reporting data message 528 may be performed by the primary controller.

Figure 6:
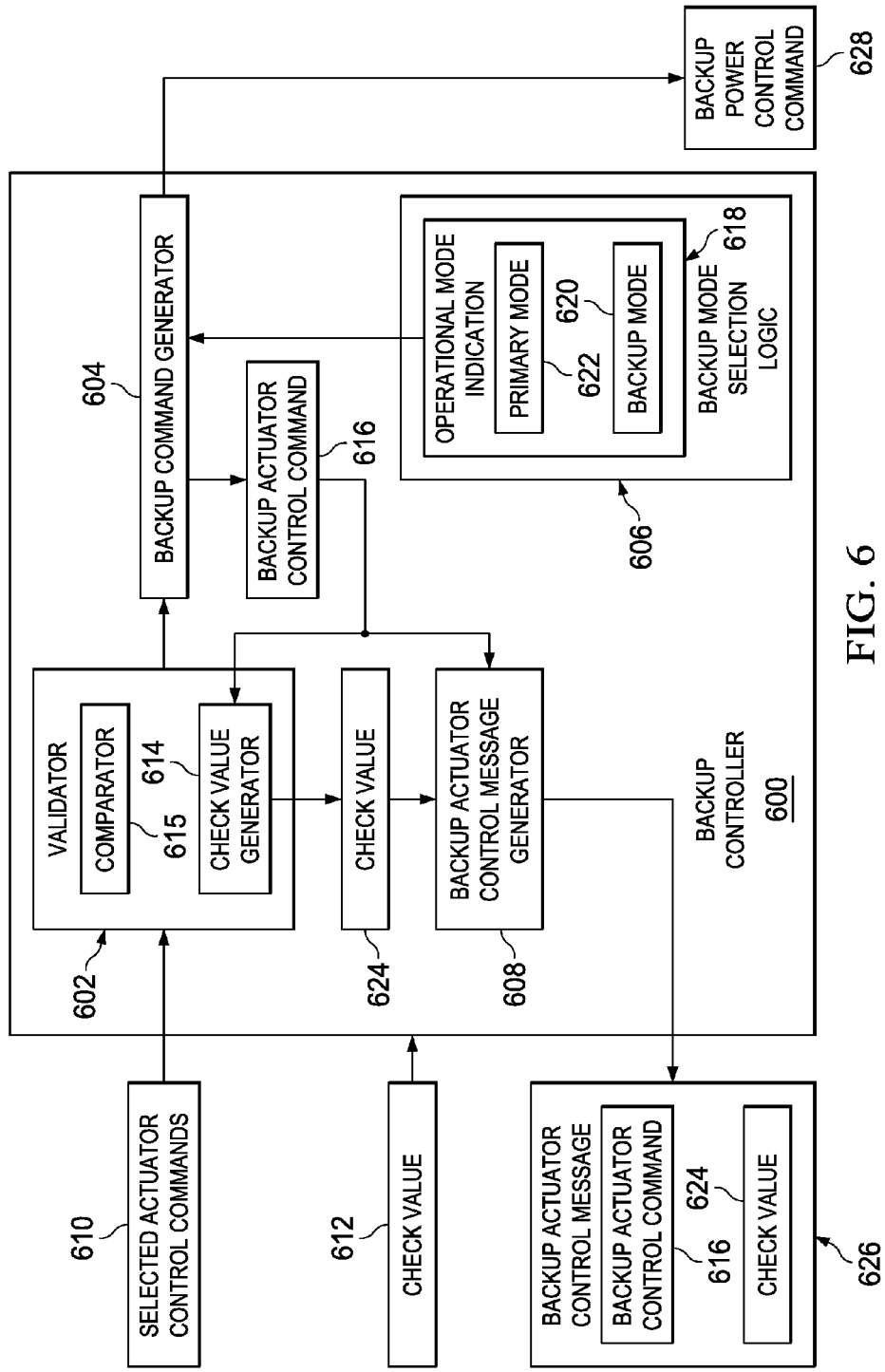
FIG. 6 is an illustration of a block diagram of a backup controller in accordance with an illustrative embodiment.

Turning to FIG. 6, an illustration of a block diagram of a backup controller is depicted in accordance with an illustrative embodiment. Backup controller 600 may be an example of one implementation of backup controller 148 in FIG. 1 or backup controller 308 in FIG. 3. Backup controller 600 may comprise validator 602, backup command generator 604, backup mode selection logic 606, and backup actuator control message generator 608.

Validator 602 may be configured to validate selected actuator control commands 610 received from a command lane using corresponding check value 612 received from a monitor lane. Validator 602 may comprise check value generator 614 and comparator 615. Check value generator 614 generates a check value for selected actuator control commands 610. Comparator 615 compares the check value generated by check value generator 614 to check value 612 from the monitor lane. Selected actuator control commands 610 are valid when the check value generated by check value generator 614 in validator 602 matches check value 612 from the monitor lane. Selected actuator control commands 610 that are determined to be valid may be provided to backup command generator 604.

Backup command generator 604 may generate backup actuator control command 616 when operational mode indication 618 generated by backup mode selection logic 606 indicates operation in backup mode 620. Backup command generator 604 may not generate backup actuator control command 616 when operational mode indication 618 generated by backup mode selection logic 606 indicates operation in primary mode 622. Backup command generator 604 may generate backup actuator control command 616 that matches selected actuator control commands 610 when operational mode indication 618 generated by backup mode selection logic 606 indicates operation in primary mode 622.

Backup mode selection logic 606 for backup controller 600 may be separate and operate independently from backup mode selection logic 344 for interface module 300 in FIG. 3. In this case, the correct actuator control commands may be provided to an actuator controller when one of backup mode selection logic 606 or backup mode selection logic 344 determines the operational mode incorrectly.

Check value generator 614 may be used to generate check value 624 for backup actuator control command 616. Backup actuator control message generator 608 may be configured to combine backup actuator control command 616 and check value 624 for backup actuator control command 616 to form backup actuator control message 626.

Backup command generator 604 may generate backup power control command 628 when operational mode indication 618 generated by backup mode selection logic 606 indicates operation in backup mode 620. Backup command generator 604 may not generate backup power control command 628 when operational mode indication 618 generated by backup mode selection logic 606 indicates operation in primary mode 622.

Figure 7:
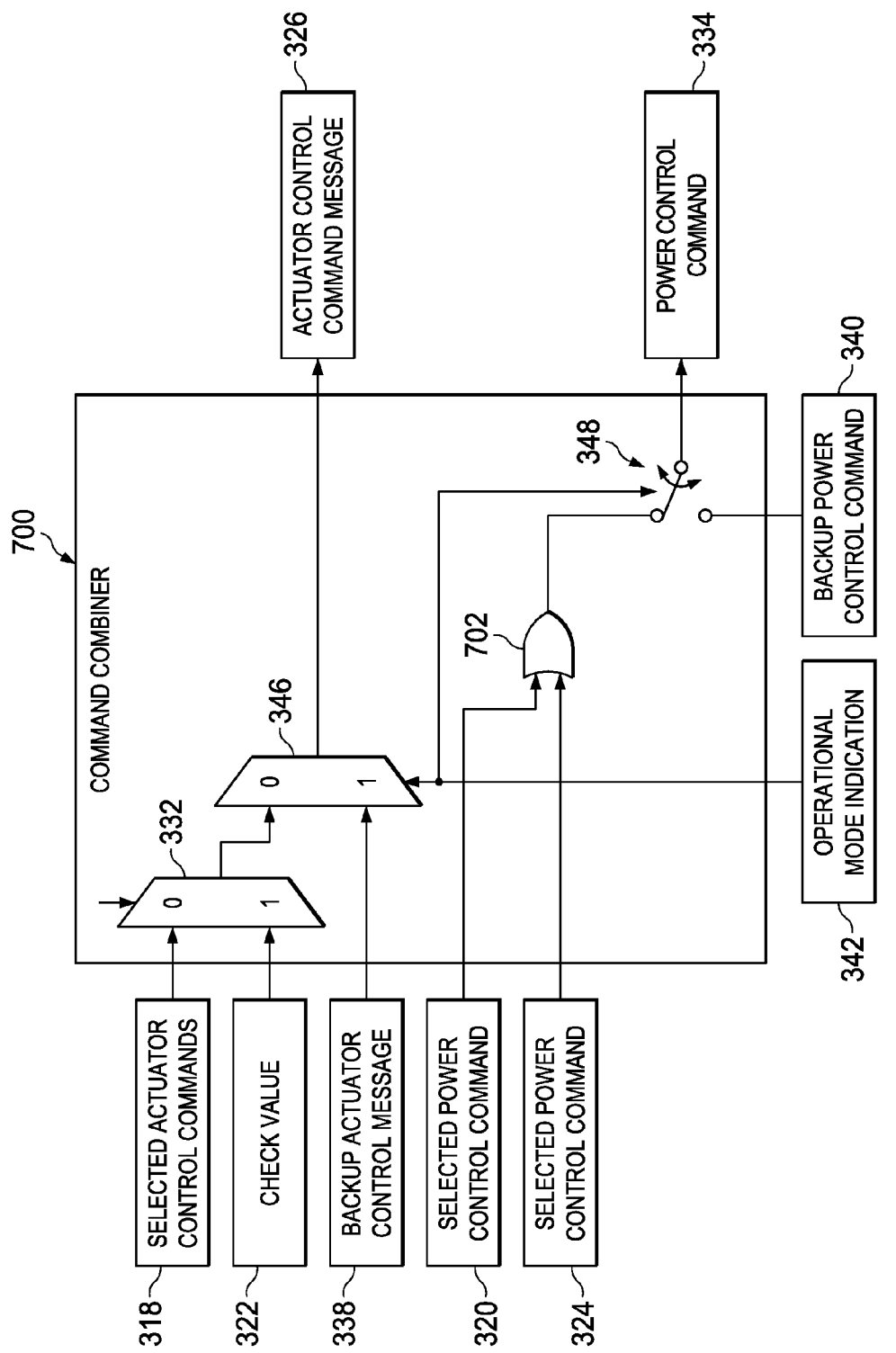
FIG. 7 is an illustration of a block diagram of an alternative command combiner in accordance with an illustrative embodiment.

Turning to FIG. 7, an illustration of a block diagram of an alternative command combiner is depicted in accordance with an illustrative embodiment. Command combiner 700 may be an alternative to command combiner 306 in FIG. 3. Command combiner 700 comprises OR logic 702 that is configured to provide power control command 334 to a power controller to remove power from an actuator controller when both selected power control command 320 from command lane 302 and selected power control command 324 from monitor lane 304 indicate that power should be removed to the actuator controller. In this example, when either selected power control command 320 from command lane 302 or selected power control command 324 from monitor lane 304 indicates that power should be provided to the actuator controller, the output of OR logic 702 will indicate that power should be provided to the actuator controller.

Figure 8:
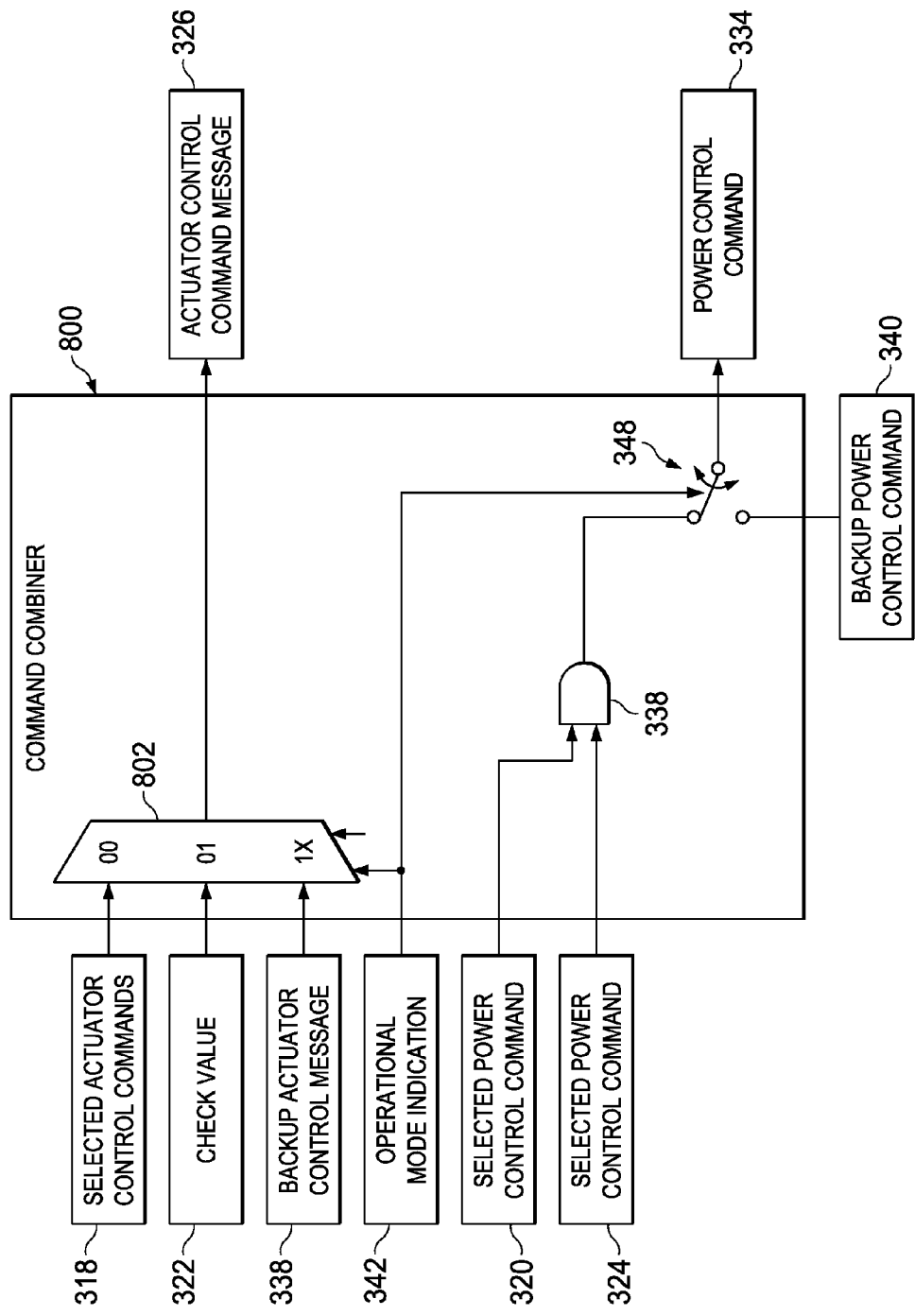
FIG. 8 is an illustration of a block diagram of another alternative command combiner in accordance with an illustrative embodiment.

Turning to FIG. 8, an illustration of a block diagram of another alternative command combiner is depicted in accordance with an illustrative embodiment. Command combiner 800 may be an alternative to command combiner 306 in FIG. 3. Command combiner 800 comprises multiplexer 802 for providing actuator control command message 326 from selected actuator control commands 318 and check value 322 or from backup actuator control message 338 using a single multiplexer.

Figure 9:
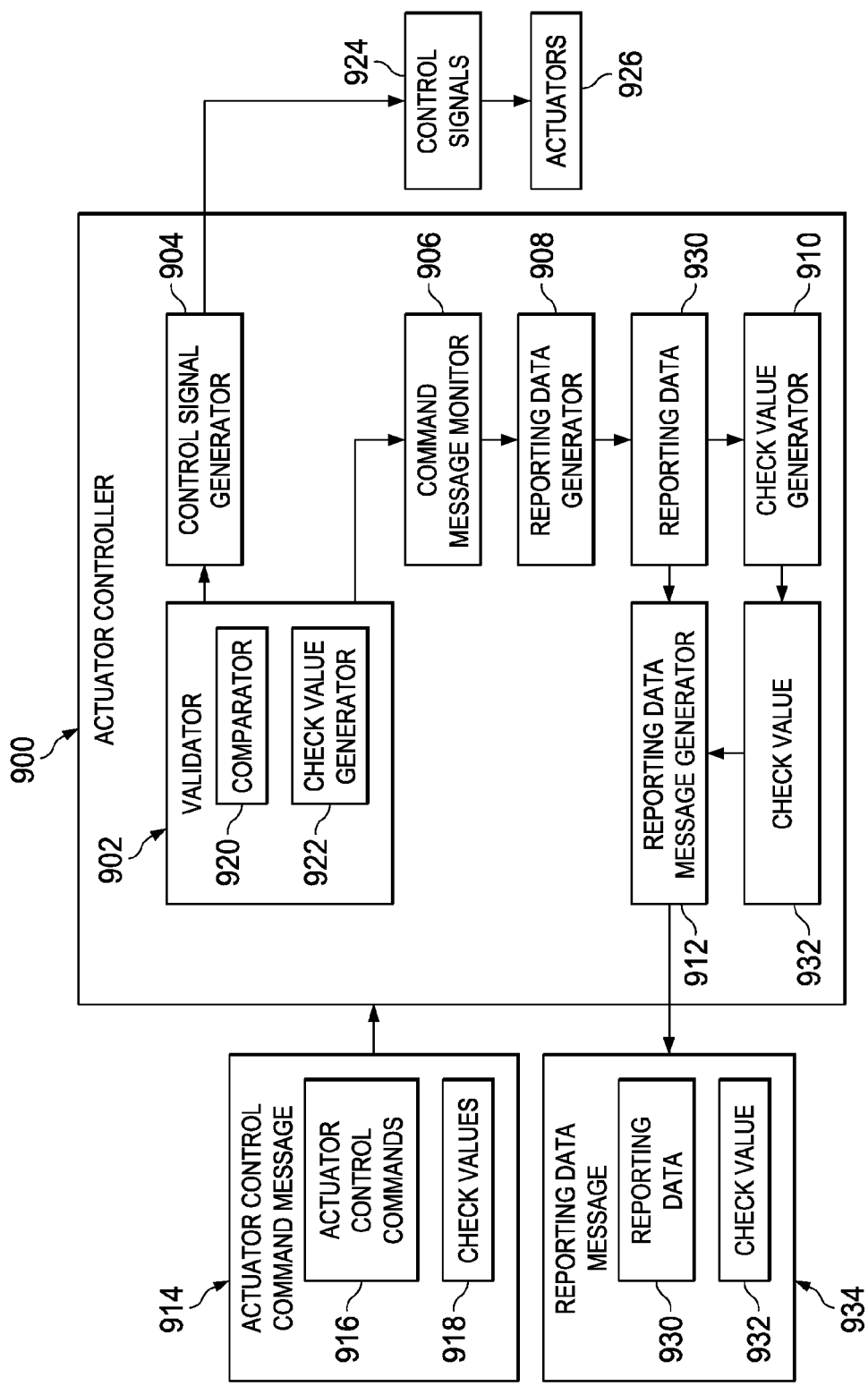
FIG. 9 is an illustration of a block diagram of an actuator controller in accordance with an illustrative embodiment.

Turning to FIG. 9, an illustration of a block diagram of an actuator controller is depicted in accordance with an illustrative embodiment. Actuator controller 900 may be an example of one implementation of number of actuator controllers 106 in FIG. 1.

Actuator controller 900 may comprise validator 902, control signal generator 904, and command message monitor 906. Validator 902 may be configured to validate actuator control command message 914 comprising actuator control commands 916 and check value 918 for actuator control commands 916. Validator 902 may comprise check value generator 922 and comparator 920. Check value generator 922 generates a check value for actuator control commands 916. Comparator 920 compares the check value generated by check value generator 922 to check value 918 from actuator control command message 914. Actuator control commands 916 are valid when the check value generated by check value generator 922 in validator 902 matches check value 918 from actuator control command message 914.

Actuator control commands 916 that are determined to be valid may be provided to control signal generator 904. Control signal generator 904 may generate appropriate control signals 924 for controlling actuators 926 in an appropriate manner as defined by valid actuator control commands 916.

Command message monitor 906 may monitor actuator control command message 914 received by actuator controller 900 for validity and freshness. For example, without limitation, command message monitor 906 may be configured to place actuators 926 in an appropriate shutdown state if no valid actuator control command messages are received for a finite duration of time.

Actuator controller 900 also may comprise reporting data generator 908, check value generator 910, and reporting data message generator 912. Reporting data generator 908 may generate reporting data 930. Check value generator 910 may generate check value 932 for reporting data 930. Reporting data message generator 912 may combine reporting data 930 and check value 932 in an appropriate manner to form reporting data message 934.

The illustrations of FIGS. 1-9 are not meant to imply physical or architectural limitations to the manner in which different illustrative embodiments may be implemented.

Other components in addition to, in place of, or both in addition to and in place of the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

Figure 10:
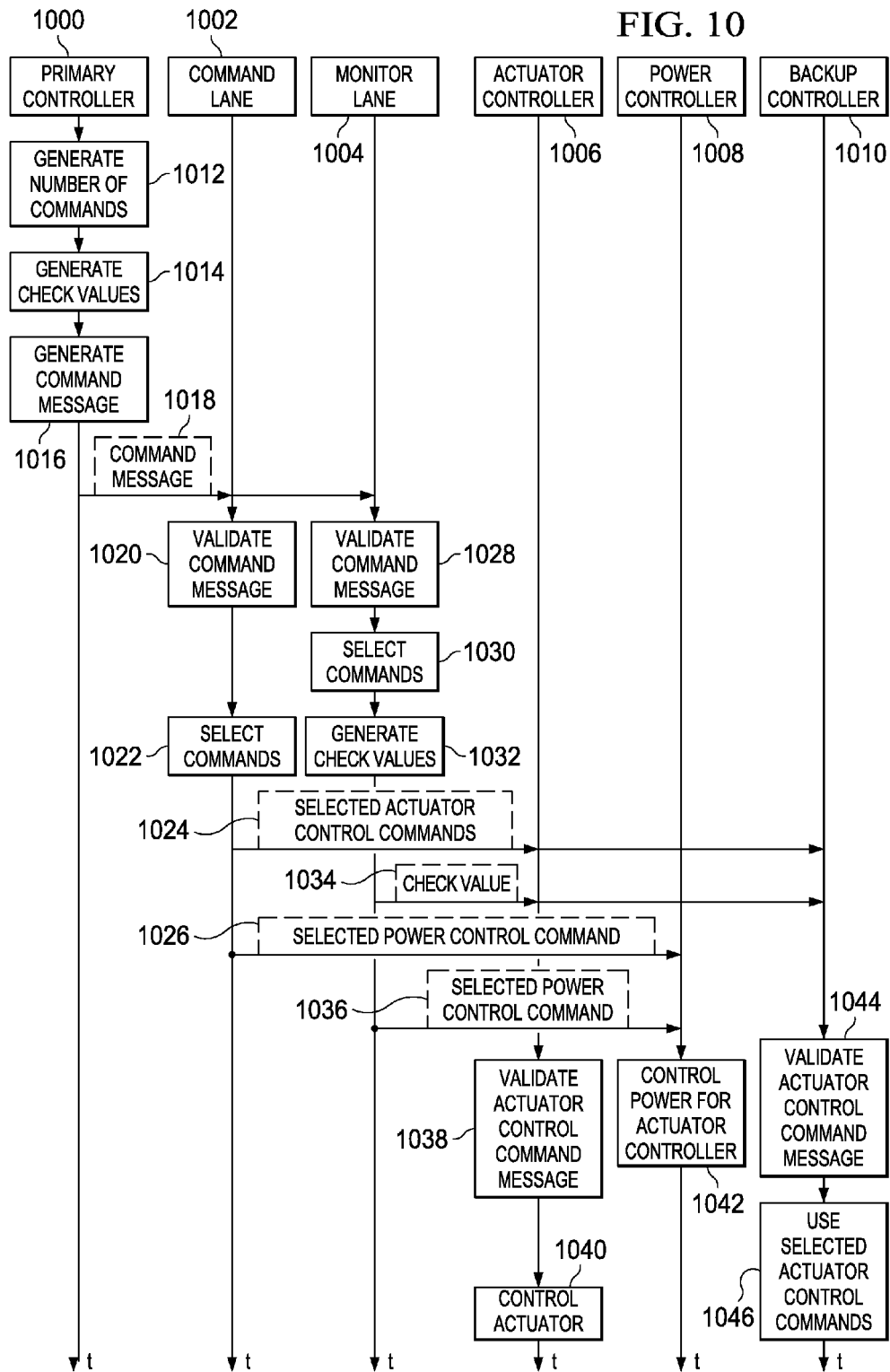
FIG. 10 is an illustration of command data flow in a primary mode in accordance with an illustrative embodiment.

Turning to FIG. 10, an illustration of command data flow in a primary mode is depicted in accordance with an illustrative embodiment. Command data flow between primary controller 1000, command lane 1002, monitor lane 1004, actuator controller 1006, power controller 1008, and backup controller 1010 during operation of an actuator control system in a primary mode is illustrated and described.

Primary controller 1000 generates number of commands 1012, generates check values 1014 for the number of commands, and generates command message 1016 comprising the number of commands and the check values. Command message 1018 is sent from primary controller 1000 to both command lane 1002 and monitor lane 1004.

Command lane 1002 validates the command message 1020 and selects commands 1022 from the command message when the command message is determined to be valid. Selected actuator control commands 1024 are sent from command lane 1002 to actuator controller 1006 and backup controller 1010. Selected power control command 1026 is sent from command lane 1002 to power controller 1008.

Monitor lane 1004 validates the command message 1028 and selects commands 1030 from the command message when the command message is determined to be valid. Monitor lane 1004 also generates check values 1032 for the selected actuator control commands. Check value 1034 is sent from monitor lane 1004 to actuator controller 1006 and backup controller 1010. Selected power control command 1036 is sent from monitor lane 1004 to power controller 1008.

Actuator controller 1006 validates the actuator control command message 1038 comprising selected actuator control commands 1024 from command lane 1002 using check value 1034 from monitor lane 1004. Actuator controller 1006 may control actuator 1040 in the manner defined by selected actuator control commands 1024 when the actuator control command message is determined to be valid.

Power controller 1008 may control power for the actuator controller 1042 in accordance with selected power control command 1026 from command lane 1002 and selected power control command 1036 from monitor lane 1004.

Backup controller 1010 may validate the actuator control command message 1044 comprising selected actuator control commands 1024 from command lane 1002 using check value 1034 from monitor lane 1004. Backup controller 1010 may use selected actuator control commands 1046 that are determined to be valid in any appropriate manner.

Figure 11:
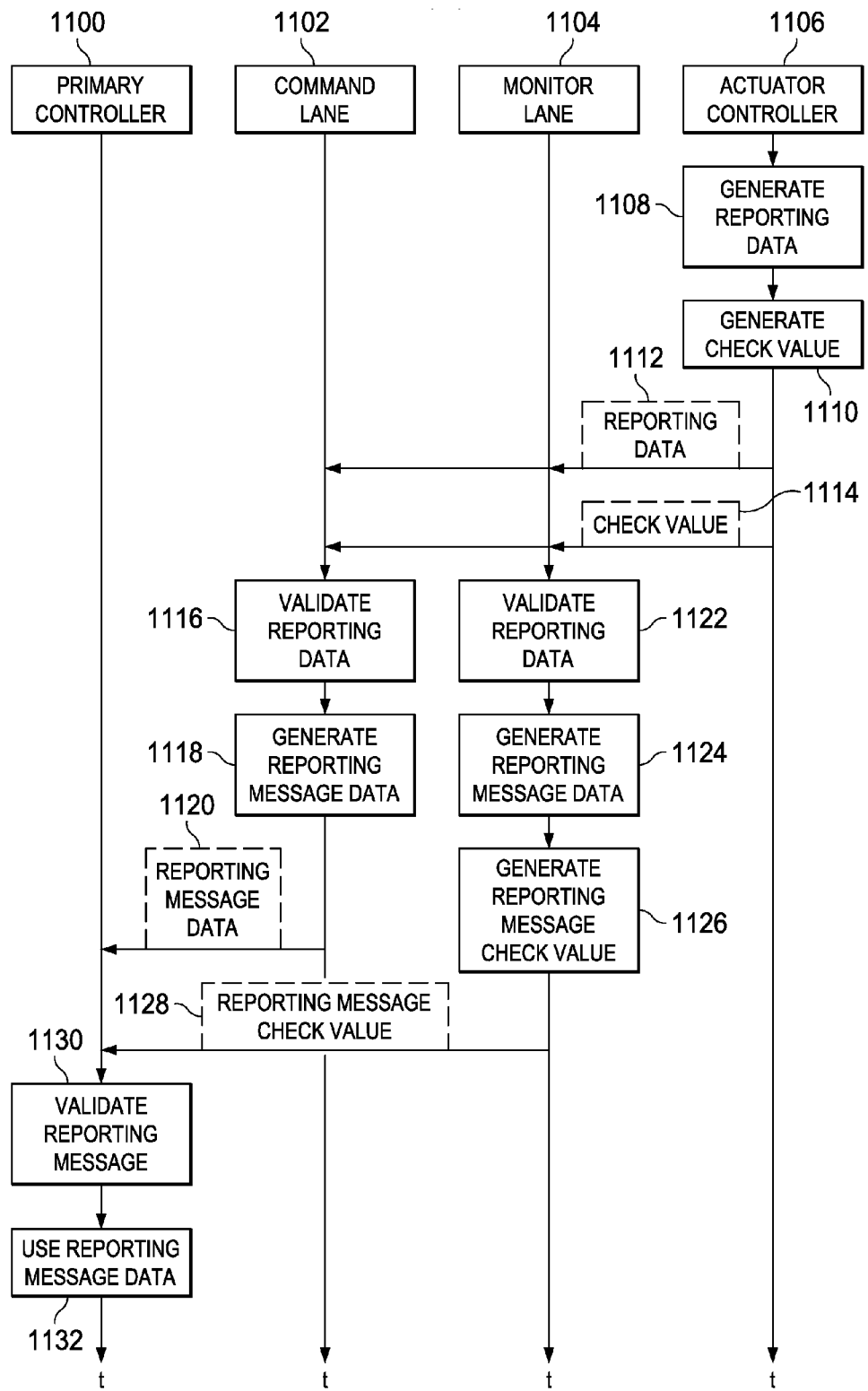
FIG. 11 is an illustration of reporting data flow in accordance with an illustrative embodiment.

Turning to FIG. 11, an illustration of reporting data flow is depicted in accordance with an illustrative embodiment. Reporting data flow between primary controller 1100, command lane 1102, monitor lane 1104, and actuator controller 1106 is illustrated and described.

Actuator controller 1106 generates reporting data 1108 and generates a check value 1110 for the reporting data. Reporting data 1112 and check value 1114 for reporting data 1112 are sent from actuator controller 1106 to both command lane 1102 and monitor lane 1104.

Command lane 1102 validates the reporting data 1116 and generates reporting message data 1118 when the reporting data is determined to be valid. Reporting message data 1120 is sent from command lane 1102 to primary controller 1100.

Monitor lane 1104 validates the reporting data 1122 and generates reporting message data 1124 when the reporting data is determined to be valid. Monitor lane 1104 also generates reporting message check value 1126 for the reporting message data. Reporting message check value 1128 is sent from monitor lane 1104 to primary controller 1100.

Primary controller 1100 validates the reporting message 1130 comprising reporting message data from command lane 1102 using reporting message check value 1128 from monitor lane 1104. Primary controller 1100 may use reporting message data 1132 in any appropriate manner when the reporting message is determined to be valid.

Figure 12:
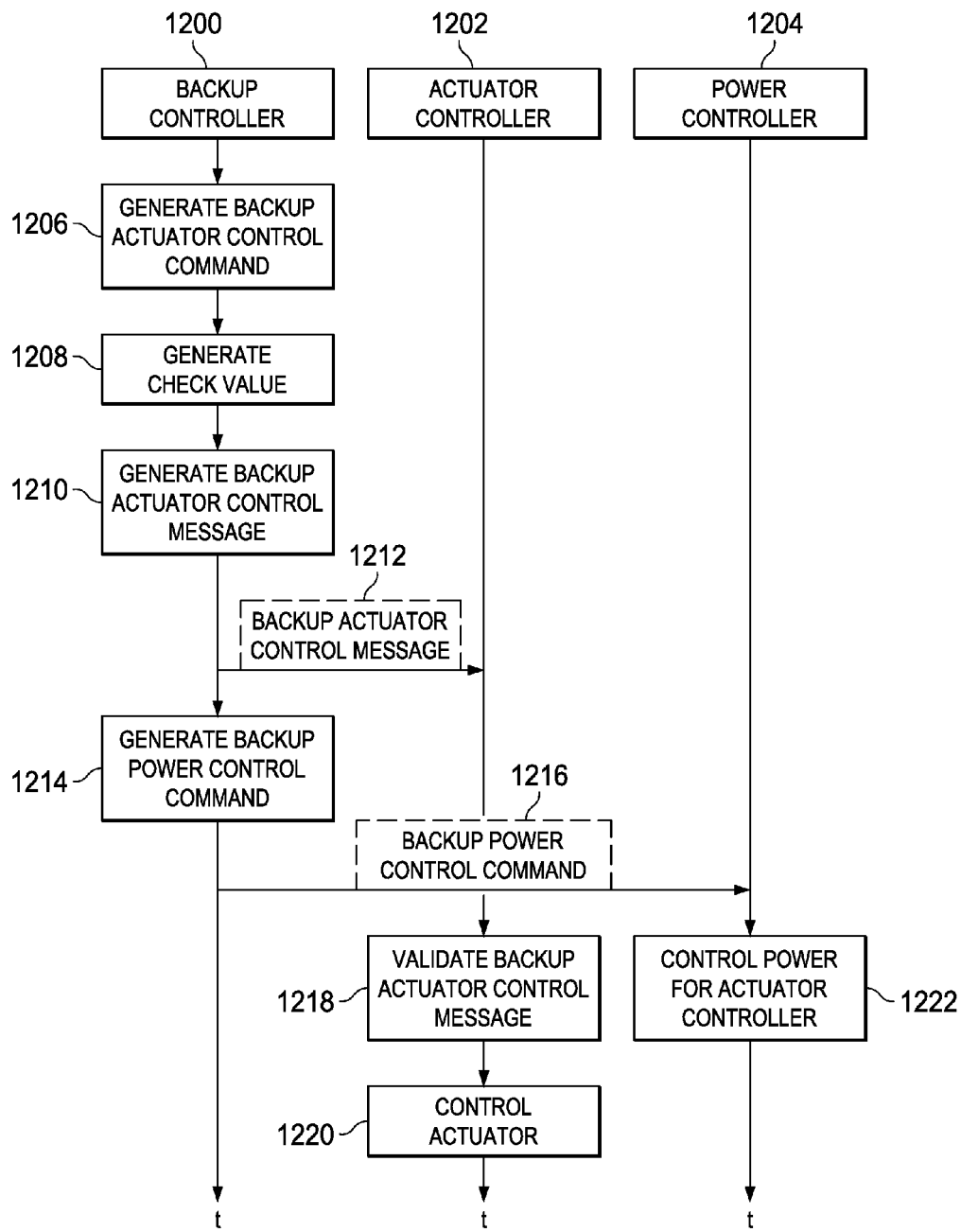
FIG. 12 is an illustration of command data flow in a backup mode in accordance with an illustrative embodiment.

Turning to FIG. 12, an illustration of command data flow in a backup mode is depicted in accordance with an illustrative embodiment. Command data flow between backup controller 1200, actuator controller 1202, and power controller 1204 during operation of an actuator control system in a backup mode is illustrated and described.

Backup controller 1200 generates a backup actuator control command 1206, generates check value 1208 for the backup actuator control command, and generates a backup actuator control message 1210 comprising the backup actuator control command and the check value. Backup actuator control message 1212 is sent from backup controller 1200 to actuator controller 1202.

Backup controller 1200 also generates a backup power control command 1214. Backup power control command 1216 is sent from backup controller 1200 to power controller 1204.

Actuator controller 1202 validates the backup actuator control message 1218 comprising the backup actuator control command using the check value provided in backup actuator control message 1212. Actuator controller 1202 may control an actuator 1220 in the manner defined by the backup actuator control command when backup actuator control message 1212 is determined to be valid.

Power controller 1204 may control power for the actuator controller in accordance with backup power control command 1216.

Figure 13:
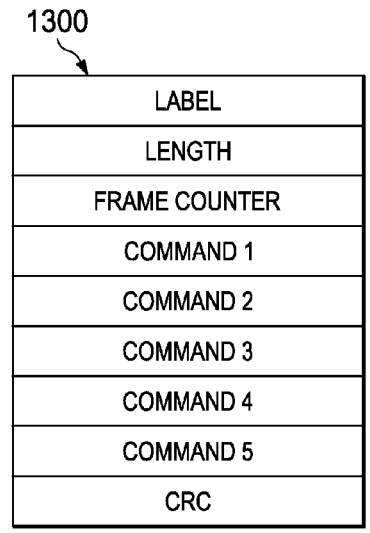
FIG. 13 is an illustration of an example of a structure for an actuator control command message in accordance with an illustrative embodiment.

Turning to FIG. 13, an illustration of an example of a structure for an actuator control command message is depicted in accordance with an illustrative embodiment. Actuator control command message 1300 may be an example of one implementation of actuator control command message 326 in FIG. 3.

Figure 14:
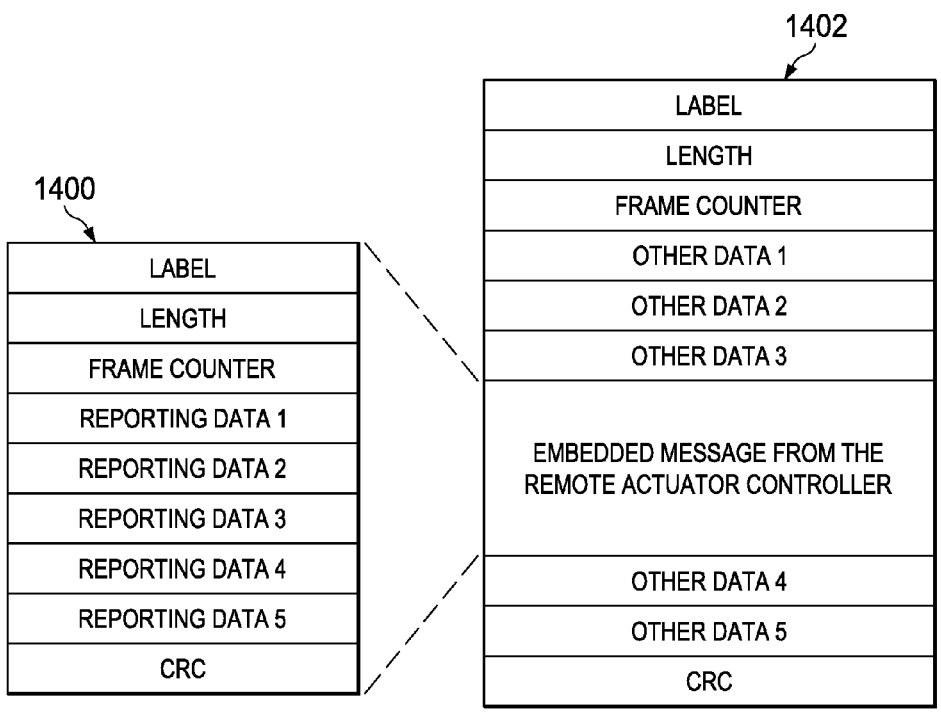
FIG. 14 is an illustration of an example of a structure for a reporting data message and a reporting message in accordance with an illustrative embodiment.

Turning to FIG. 14, an illustration of an example of a structure for a reporting data message and a reporting message is depicted in accordance with an illustrative embodiment. Reporting data message 1400 may be an example of one implementation of reporting data message 350 in FIG. 3. Reporting message 1402 may be an example of one implementation of reporting messages 360 in FIG. 3. Reporting data message 1400 may be embedded in reporting message 1402.

Figure 15:
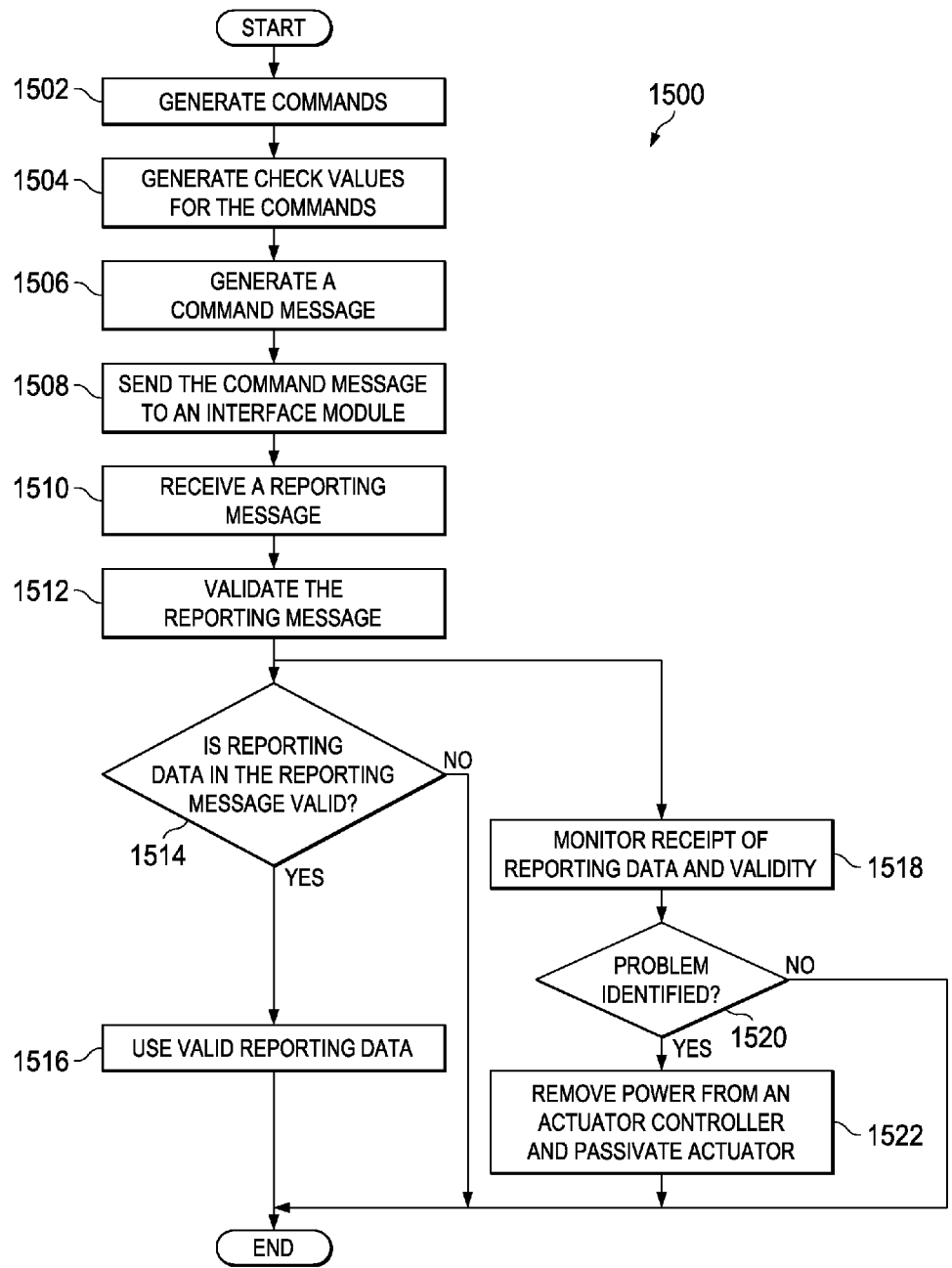
FIG. 15 is an illustration of a flowchart of a process for a primary controller in accordance with an illustrative embodiment.

Turning to FIG. 15, an illustration of a flowchart of a process for a primary controller is depicted in accordance with an illustrative embodiment. For example, process 1500 may be performed by number of primary controllers 104 in FIG. 1 or primary controller 200 in FIG. 2.

Process 1500 may begin with generating commands (operation 1502) and generating check values for the commands (operation 1504). A command message comprising the commands and the check values then may be generated (operation 1506). The command message then may be sent to an interface module (operation 1508) for delivery to an actuator controller via the interface module.

A reporting message may be received (operation 1510). The reporting message may be validated (operation 1512) to determine whether the reporting data in the reporting message is valid (operation 1514). The reporting data may be used in any appropriate manner (operation 1516) in response to a determination at operation 1514 that the reporting data is valid, with the process terminating thereafter. The process may terminate without using the reporting data in response to a determination at operation 1514 that the reporting data is not valid.

Returning to operation 1512, the receipt of reporting data and the validity thereof as determined by operation 1512 may be monitored (operation 1518). It then may be determined whether there is a problem with the receipt or validity of the reporting data received (operation 1520). Power may be removed from an actuator controller and the corresponding actuator may be passivated (operation 1522) in response to a determination at operation 1520 that a problem is identified, with the process terminating thereafter. Otherwise, process 1500 may terminate in response to a determination at operation 1520 that a problem is not identified.

Figure 16:
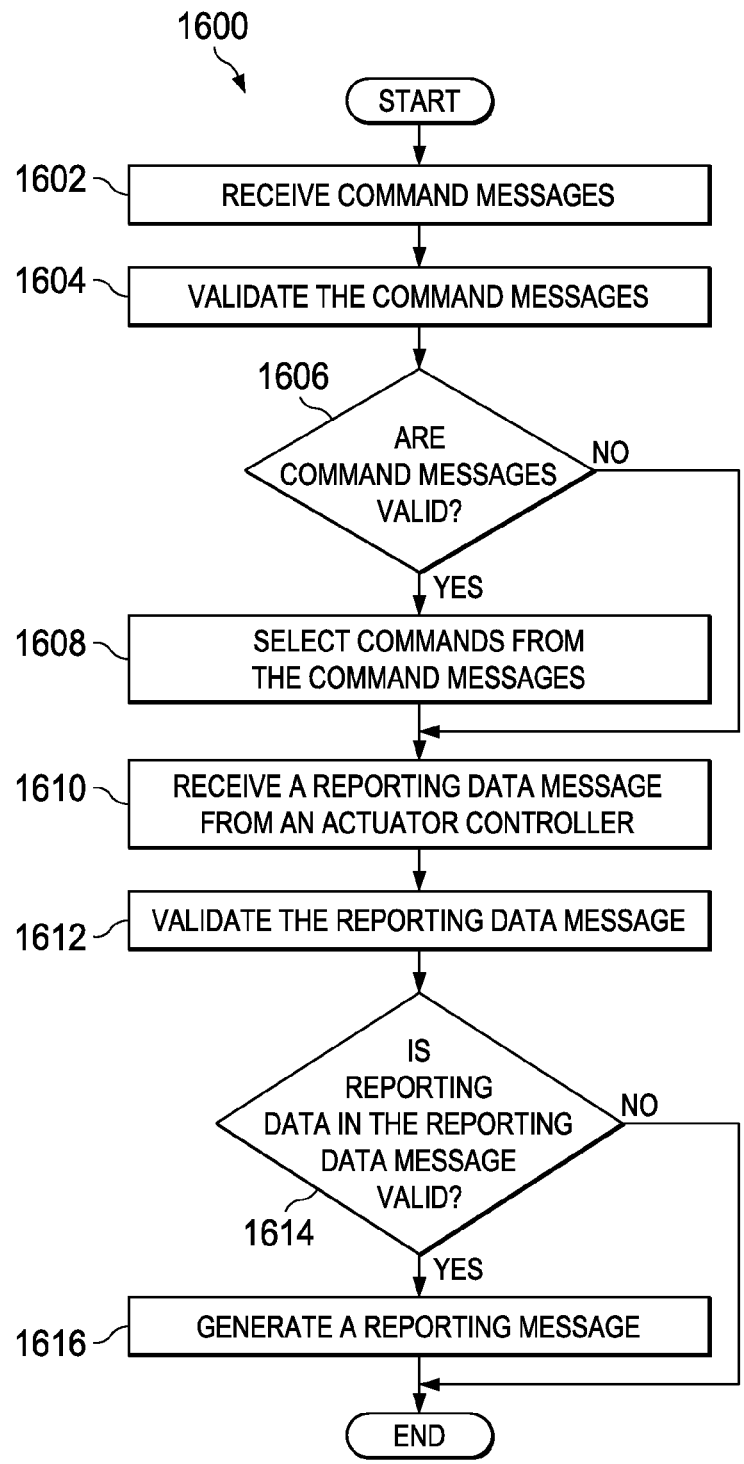
FIG. 16 is an illustration of a flowchart of a process for a command lane in accordance with an illustrative embodiment.

Turning to FIG. 16, an illustration of a flowchart of a process for a command lane is depicted in accordance with an illustrative embodiment. For example, process 1600 may be performed by command lane 142 in FIG. 1, command lane 302 in FIG. 3, or command lane 400 in FIG. 4.

Process 1600 may begin with receiving command messages (operation 1602). The command messages may be validated (operation 1604) to determine whether the command messages are valid (operation 1606). Commands from the command messages may be selected (operation 1608) in response to a determination at operation 1606 that the command messages are valid. Commands from the command messages may not be selected, that is, operation 1608 may not be performed, in response to a determination at operation 1606 that the command messages are not valid.

A reporting data message may be received from an actuator controller (operation 1610). The reporting data message may be validated (operation 1612) to determine whether reporting data in the reporting data message is valid (operation 1614). Process 1600 may terminate in response to a determination at operation 1614 that the reporting data in the reporting data message is not valid. A reporting message including reporting data from the reporting data message may be generated (operation 1616) in response to a determination at operation 1614 that the reporting data in the reporting data message is valid, with the process terminating thereafter.

The reporting data message may not be validated, that is, operations 1612 and 1614 may not be performed, when the reporting data message is embedded in a reporting message sent from an interface module to a primary controller. In this case, validation of the reporting data message may be performed by the primary controller.

Figure 17:
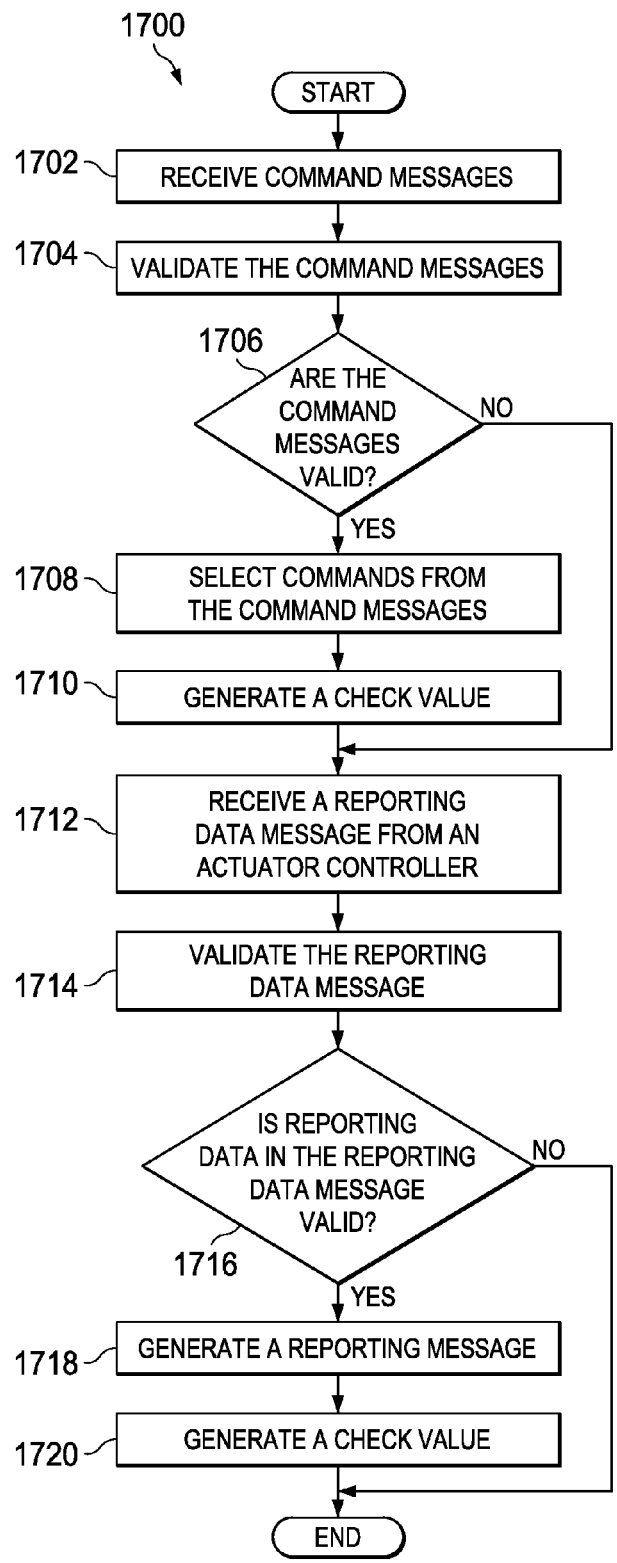
FIG. 17 is an illustration of a flowchart of a process for a monitor lane in accordance with an illustrative embodiment.

Turning to FIG. 17, an illustration of a flowchart of a process for a monitor lane is depicted in accordance with an illustrative embodiment. For example, process 1700 may be performed by monitor lane 144 in FIG. 1, monitor lane 304 in FIG. 3, or monitor lane 500 in FIG. 5.

Process 1700 may begin with receiving command messages (operation 1702). The command messages may be validated (operation 1704) to determine whether the command messages are valid (operation 1706). Commands from the command messages may be selected (operation 1708) in response to a determination at operation 1706 that the command messages are valid. A check value for the selected command messages then may be generated (operation 1710). Commands from the command messages may not be selected, that is, operations 1708 and 1710 may not be performed, in response to a determination at operation 1706 that the command messages are not valid.

A reporting data message may be received from an actuator controller (operation 1712). The reporting data message may be validated (operation 1714) to determine whether reporting data in the reporting data message is valid (operation 1716). Process 1700 may terminate in response to a determination at operation 1716 that the reporting data in the reporting data message is not valid. A reporting message including reporting data from the reporting data message may be generated (operation 1718) in response to a determination at operation 1716 that the reporting data in the reporting data message is valid. A check value for the reporting message may be generated (operation 1720), with the process terminating thereafter.

The reporting data message may not be validated, that is, operations 1714 and 1716 may not be performed, when the reporting data message is embedded in a reporting message sent from an interface module to a primary controller. In this case, validation of the reporting data message may be performed by the primary controller.

Figure 18:
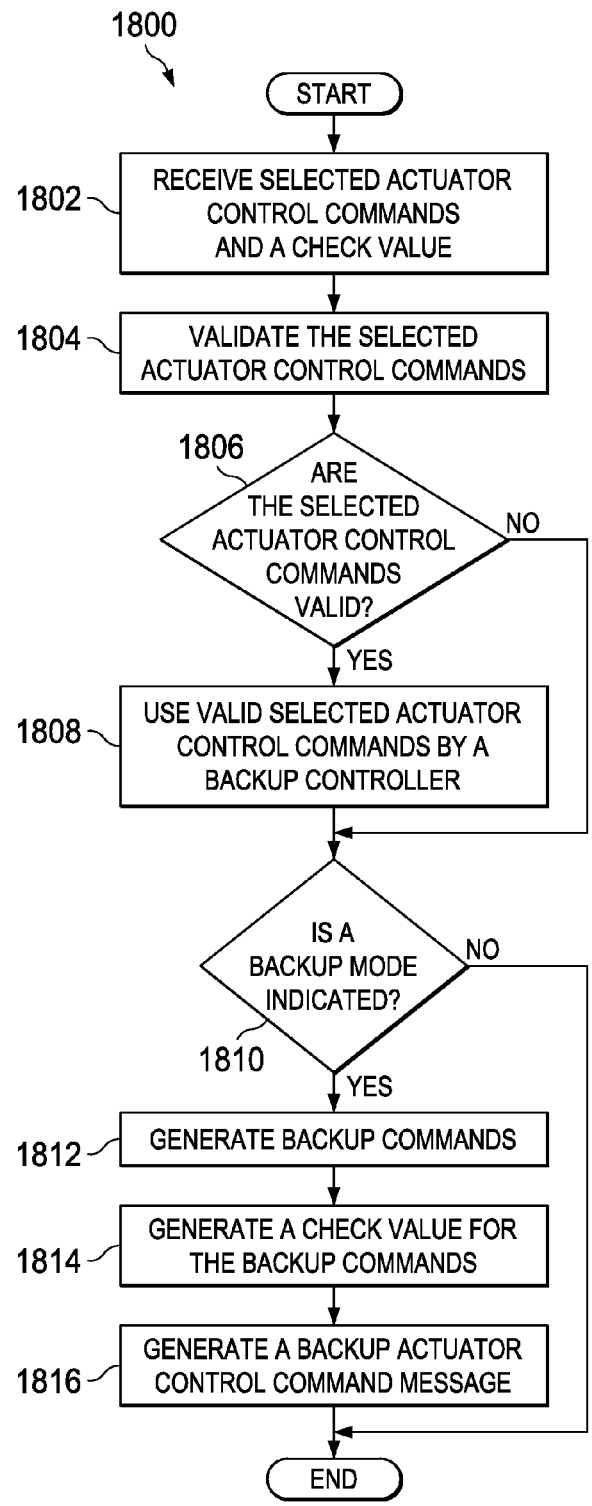
FIG. 18 is an illustration of a flowchart of a process for a backup controller in accordance with an illustrative embodiment.

Turning to FIG. 18, an illustration of a flowchart of a process for a backup controller is depicted in accordance with an illustrative embodiment. For example, process 1800 may be performed by backup controller 148 in FIG. 1, backup controller 308 in FIG. 3, or backup controller 600 in FIG. 6.

Process 1800 may begin with receiving selected actuator control commands and a check value (operation 1802). The selected actuator control commands may be validated (operation 1804) using the check value to determine whether the selected actuator control commands are valid (operation 1806). Valid selected actuator control commands may be used in an appropriate manner by a backup controller (operation 1808) in response to a determination at operation 1806 that the selected actuator control commands are valid. For example, without limitation, operation 1808 may include using the selected actuator control commands to generate backup actuator control commands that match the selected actuator control commands when a primary mode is indicated. The selected actuator control commands may not be used by the backup controller in response to a determination at operation 1806 that the selected actuator control commands are not valid.

It may be determined whether a backup mode is indicated (operation 1810). Process 1800 may terminate in response to a determination at operation 1810 the backup mode is not indicated. In response to a determination at operation 1810 that backup mode is indicated, backup commands may be generated (operation 1812), a check value for the backup commands may be generated (operation 1814), and a backup actuator control command message comprising the backup commands and the check value may be generated (operation 1816), with the process terminating thereafter.

Figure 19:
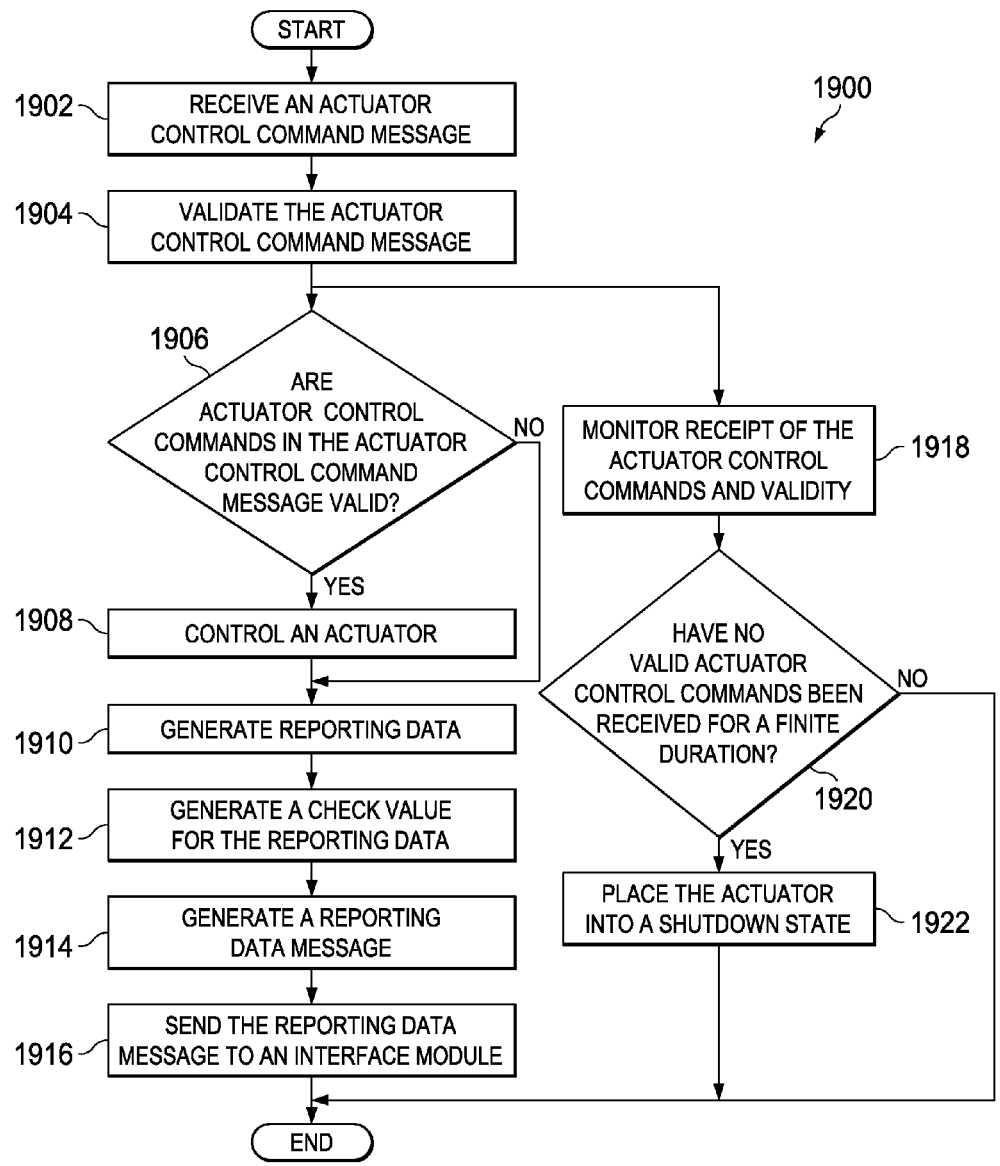
FIG. 19 is an illustration of a flowchart of a process for an actuator controller in accordance with an illustrative embodiment.

Turning to FIG. 19, an illustration of a flowchart of a process for an actuator controller is depicted in accordance with an illustrative embodiment. For example, process 1900 may be performed by number of actuator controllers 106 in FIG. 1 or actuator controller 900 in FIG. 9.

Process 1900 may begin with receiving an actuator control command message (operation 1902). The actuator control command message may be validated (operation 1904) to determine whether actuator control commands in the actuator control command message are valid (operation 1906). An actuator may be controlled in the manner defined by the actuator control commands (operation 1908) in response to a determination at operation 1906 that the actuator control commands in the actuator control command message are valid. The actuator may not be controlled in accordance with the actuator control commands in response to a determination at operation 1906 that the actuator control commands in the actuator control command message are not valid.

Reporting data may be generated (operation 1910), a check value for the reporting data may be generated (operation 1912), and a reporting data message comprising the reporting data and the check value for the reporting data may be generated (operation 1914). The reporting data message may be sent to an interface module (operation 1916) for delivery to a primary controller via the interface module, with the process terminating thereafter.

Returning to operation 1904, the receipt of actuator control commands and the validity thereof as determined by operation 1904 may be monitored (operation 1918). It may be determined whether no valid actuator control commands have been received for a finite duration (operation 1920). The actuator may be placed into a shutdown state (operation 1922) in response to a determination at operation 1920 that no valid actuator control commands have been received for a finite duration, with the process terminating thereafter. Process 1900 may terminate in response to a determination at operation 1920 that valid actuator control commands have been received within the finite duration of time.

Figure 20:
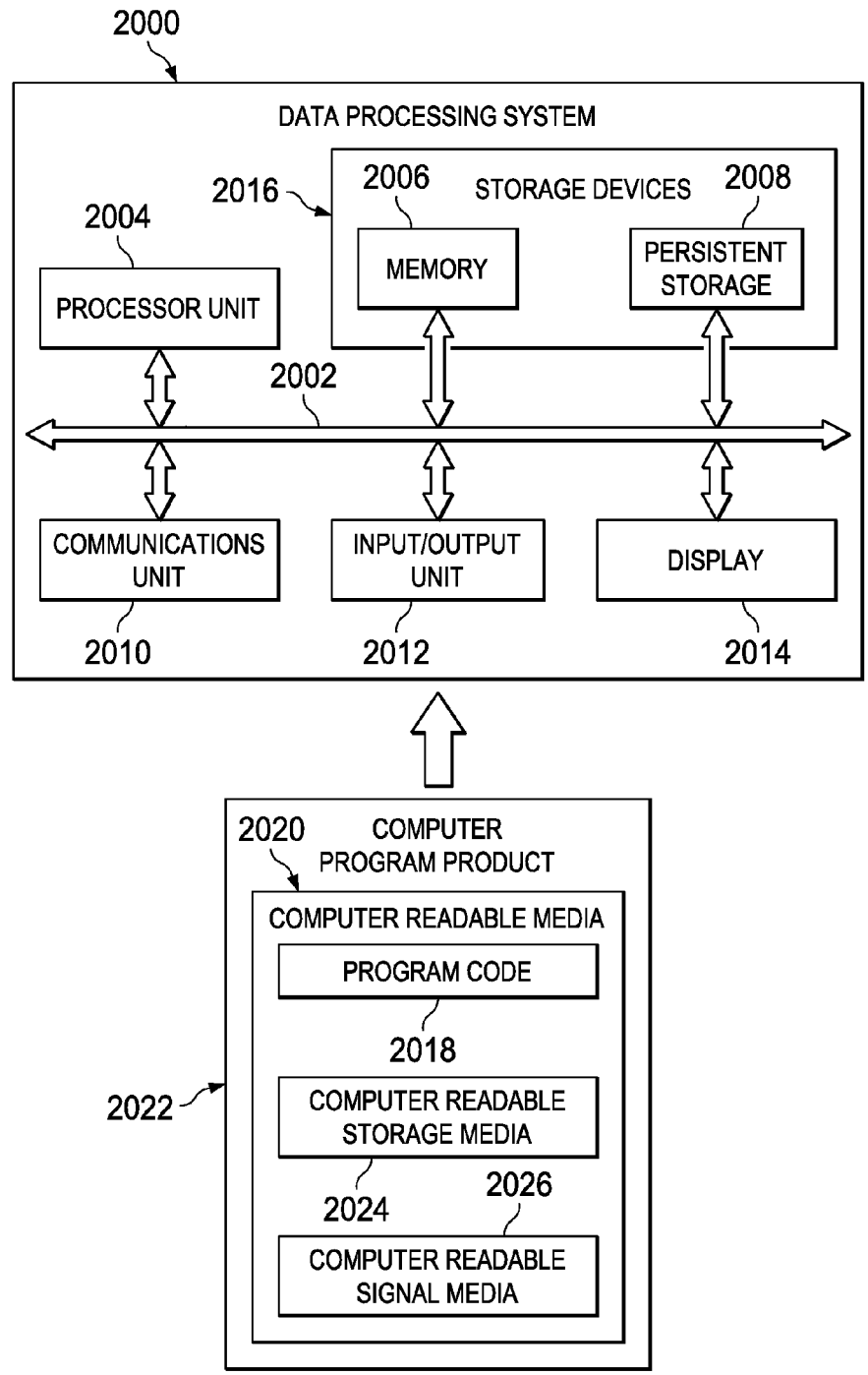
FIG. 20 is an illustration of a block diagram of a data processing system in accordance with an illustrative embodiment.

Turning to FIG. 20, an illustration of a block diagram of a data processing system is depicted in accordance with an illustrative embodiment. Data processing system 2000 may be an example of one implementation of a system on which various portions and functions of actuator control system 100 in FIG. 1 may be implemented. In this illustrative example, data processing system 2000 includes communications framework 2002, which provides communications between processor unit 2004, memory 2006, persistent storage 2008, communications unit 2010, input/output (I/O) unit 2012, and display 2014.

Processor unit 2004 serves to execute instructions for software that may be loaded into memory 2006. Processor unit 2004 may be a number of processors, a multi-processor core, or some other type of processor, depending on the particular implementation. Further, processor unit 2004 may be implemented using a number of heterogeneous processor systems in which a main processor is present with secondary processors on a single chip. As another illustrative example, processor unit 2004 may be a symmetric multi-processor system containing multiple processors of the same type.

Memory 2006 and persistent storage 2008 are examples of storage devices 2016. A storage device is any piece of hardware that is capable of storing information, such as, for example, without limitation, data, program code in functional form, and/or other suitable information either on a temporary basis and/or a permanent basis. Storage devices 2016 also may be referred to as computer readable storage devices in these examples. Memory 2006, in these examples, may be, for example, a random access memory or any other suitable volatile or non-volatile storage device. Persistent storage 2008 may take various forms, depending on the particular implementation.

For example, persistent storage 2008 may contain one or more components or devices. For example, persistent storage 2008 may be a hard drive, a flash memory, a rewritable optical disk, a rewritable magnetic tape, or some combination of the above. The media used by persistent storage 2008 also may be removable. For example, a removable hard drive may be used for persistent storage 2008.

Communications unit 2010, in these examples, provides for communications with other data processing systems or devices. In these examples, communications unit 2010 is a network interface card. Communications unit 2010 may provide communications through the use of either or both physical and wireless communications links.

Input/output unit 2012 allows for input and output of data with other devices that may be connected to data processing system 2000. For example, input/output unit 2012 may provide a connection for user input through a keyboard, a mouse, and/or some other suitable input device. Further, input/output unit 2012 may send output to a printer. Display 2014 provides a mechanism to display information to a user.

Instructions for the operating system, applications, and/or programs may be located in storage devices 2016, which are in communication with processor unit 2004 through communications framework 2002. In these illustrative examples, the instructions are in a functional form on persistent storage 2008. These instructions may be loaded into memory 2006 for execution by processor unit 2004. The processes of the different embodiments may be performed by processor unit 2004 using computer implemented instructions, which may be located in a memory, such as memory 2006.

These instructions are referred to as program code, computer usable program code, or computer readable program code that may be read and executed by a processor in processor unit 2004. The program code in the different embodiments may be embodied on different physical or computer readable storage media, such as memory 2006 or persistent storage 2008.

Program code 2018 is located in a functional form on computer readable media 2020 that is selectively removable and may be loaded onto or transferred to data processing system 2000 for execution by processor unit 2004. Program code 2018 and computer readable media 2020 form computer program product 2022 in these examples. In one example, computer readable media 2020 may be computer readable storage media 2024 or computer readable signal media 2026. Computer readable storage media 2024 may include, for example, an optical or magnetic disk that is inserted or placed into a drive or other device that is part of persistent storage 2008 for transfer onto a storage device, such as a hard drive, that is part of persistent storage 2008.

Computer readable storage media 2024 also may take the form of a persistent storage, such as a hard drive, a thumb drive, or a flash memory, that is connected to data processing system 2000. In some instances, computer readable storage media 2024 may not be removable from data processing system 2000. In these examples, computer readable storage media 2024 is a physical or tangible storage device used to store program code 2018 rather than a medium that propagates or transmits program code 2018. Computer readable storage media 2024 is also referred to as a computer readable tangible storage device or a computer readable physical storage device. In other words, computer readable storage media 2024 is a media that can be touched by a person.

Alternatively, program code 2018 may be transferred to data processing system 2000 using computer readable signal media 2026. Computer readable signal media 2026 may be, for example, a propagated data signal containing program code 2018. For example, computer readable signal media 2026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 2018 may be downloaded over a network to persistent storage 2008 from another device or data processing system through computer readable signal media 2026 for use within data processing system 2000. For instance, program code stored in a computer readable storage medium in a server data processing system may be downloaded over a network from the server to data processing system 2000. The data processing system providing program code 2018 may be a server computer, a client computer, or some other device capable of storing and transmitting program code 2018.

The different components illustrated for data processing system 2000 are not meant to provide architectural limitations to the manner in which different embodiments may be implemented. The different illustrative embodiments may be implemented in a data processing system including components in addition to or in place of those illustrated for data processing system 2000.

Other components shown in FIG. 20 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 2004 may take the form of a hardware unit that has circuits that are manufactured or configured for a particular use. This type of hardware may perform operations without needing program code to be loaded into a memory from a storage device to be configured to perform the operations.

For example, when processor unit 2004 takes the form of a hardware unit, processor unit 2004 may be a circuit system, an application-specific integrated circuit (ASIC), a programmable logic device, or some other suitable type of hardware configured to perform a number of operations. With a programmable logic device, the device is configured to perform the number of operations.

The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 2018 may be omitted because the processes for the different embodiments are implemented in a hardware unit.

In still another illustrative example, processor unit 2004 may be implemented using a combination of processors found in computers and hardware units. Processor unit 2004 may have a number of hardware units and a number of processors that are configured to run program code 2018. With this depicted example, some of the processes may be implemented in the number of hardware units, while other processes may be implemented in the number of processors.

In another example, a bus system may be used to implement communications framework 2002 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 2006, or a cache, such as found in an interface and memory controller hub that may be present in communications framework 2002.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in a block may occur out of the order noted in the figures. For example, in some cases, two blocks shown in succession may be executed substantially concurrently, or the functions associated with blocks may sometimes be performed in the reverse order, depending upon the functionality involved. Also, other blocks may be added in addition to the illustrated blocks in a flowchart or block diagram.

Further, different illustrative embodiments may provide different advantages as compared to other illustrative embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. An apparatus in a flight control system that comprises a primary controller configured to:
   generate a command message;
   generate a command check value; and
   transmit the command message and command check value to an interface module, such that the interface module comprises:
   a command lane configured:
      to receive the command message;
      comprising a command lane validator configured to validate the command check value; and
      responsive to a validation, from the command lane validator, of the command message, send the command message to an actuator controller via a command combiner;
   a monitor lane configured:
      to receive the command message;
      comprising a monitor lane validator configured to validate the command message;
      responsive to a validation, from the monitor lane validator, of the command message, to generate a monitor check value for the command message; and send the command message and the monitor check value to the command combiner the command combiner configured to:
  combine the command message from the command lane and the monitor check value from the monitor lane to form an actuator control command message: and
  send the actuator control command message to the actuator controller.

2. The apparatus of claim 1 further comprising:
the actuator controller configured to determine validity of the actuator control command message based upon the monitor check value and to control an actuator based upon the command message in response to a determination of validity for the actuator control command message.

3. The apparatus of claim 1, further comprising:
the command lane configured to receive a plurality of commands from a number of primary controllers and select a first selected power control command from the plurality of commands using a selection rule;
the monitor lane configured to receive the plurality of commands from the number of primary controllers and select a second selected power control command from the plurality of commands using the selection rule; and
the command combiner configured to send a power control command, to provide power, to a power controller when both the first selected power control command and the second selected power control command direct power application to the actuator controller.

4. The apparatus of claim 1, further comprising:
the command lane configured to receive a plurality of commands from a number of primary controllers and select a first selected power control command from the plurality of commands using a selection rule;
the monitor lane configured to receive the plurality of commands from the number of primary controllers and select a second selected power control command from the plurality of commands using the selection rule; and
the command combiner configured to send a power control command, to remove power, to a power controller when both the first selected power control command and the second selected power control command direct power removal from the actuator controller.

5. The apparatus of claim 1 further comprising:
a backup controller configured to:
  receive the command message from the command lane;
  generate a first backup actuator control command that matches the command message and a check value for the first backup actuator control command in response to an operational mode indication, of the apparatus being in primary mode, generated by a first backup mode selection logic; and
  generate a second backup actuator control command and a check value for the second backup actuator control command in response to the operational mode indication, of the apparatus being in backup mode, generated by the first backup mode selection logic; and
wherein the command combiner configured to send, to the actuator controller in response to an operational mode indication, of the apparatus in the backup mode, generated by a second backup mode selection logic, one of:
  the first backup actuator control command and the check value for the first backup actuator control command; and
  the second backup actuator control command and the check value for the second backup actuator control command.

6. The apparatus of claim 5, wherein:
the backup controller is configured to generate a backup power control command in response to the operational mode indication generated by the first backup mode selection logic indicating that the apparatus is in the backup mode; and
the command combiner is configured to send the backup power control command to a power controller as a power control command in response to the operational mode indication generated by the second backup mode selection logic indicating that the apparatus is in the backup mode.

7. The apparatus of claim 5, wherein:
the command combiner is configured to send the command message from the command lane and the monitor check value to the backup controller in response to the operational mode indication generated by the second backup mode selection logic indicating that the apparatus is in the primary mode.

8. The apparatus of claim 1, further comprising:
the command lane configured to receive reporting data from the actuator controller;
the monitor lane configured to:
  receive the reporting data from the actuator controller; and
  generate a reporting message check value for the reporting data; and
a reporting message combiner configured to:
  combine the reporting data from the command lane and the reporting message check value from the monitor lane to form a reporting message; and
  send the reporting message to the primary controller.

9. The apparatus of claim 1, further comprising:
the primary controller comprises a flight controller for an aircraft;
and an actuator configured to move a flight control system for the aircraft in response to control signals generated by the actuator controller.

10. A method of controlling an actuator in a flight control system, the method comprising:
a primary controller:
  generating a command message;
  generating a command check value; and
  transmitting the command message and command check value to an interface module, the interface module comprising:
    a command lane receiving the command message;
    a monitor lane receiving the command message and generating a monitor check value for the command message;
    combining the command message from the command lane and the monitor check value from the monitor lane to form an actuator control command message; and
    sending the actuator control command message to an actuator controller for controlling the actuator.

11. The method of claim 10 further comprising:
determining a validity of the actuator control command message using a validator in the actuator controller using the command message from the command lane and the monitor check value; and
controlling, in response to determining the validity of the actuator control command message, the actuator as indicated by the command message.

12. The method of claim 10 further comprising:
the command lane receiving a plurality of commands from a number of primary controllers and selecting a first selected power control command from the plurality of commands using a selection rule;

the monitor lane receiving the plurality of commands from the number of primary controllers and selecting a second selected power control command from the plurality of commands by the monitor lane using the selection rule; and sending a power control command, to provide power to the actuator controller, to a power controller responsive to both the first selected power control command and the second selected power control command directing power application to the actuator controller.

13. The method of claim 10 further comprising:

the command lane receiving a plurality of commands from a number of primary controllers and selecting a first selected power control command from the plurality of commands using a selection rule;

the monitor lane receiving the plurality of commands from the number of primary controllers and selecting a second selected power control command from the plurality of commands by the monitor lane using the selection rule; and sending a power control command, to remove power from the actuator controller, to a power controller responsive to both the first selected power control command and the second selected power control command directing power removal from the actuator controller.

14. The method of claim 10 further comprising:

generating a first backup actuator control command that matches the command message and a check value for the first backup actuator control command by a backup controller in response to an operational mode indication generated by a first backup mode selection logic indicating a primary mode;

generating a second backup actuator control command and a check value for the second backup actuator control command by the backup controller in response to the operational mode indication generated by the first backup mode selection logic indicating a backup mode; and sending, to the actuator controller in response to an operational mode indication, of the apparatus in the backup mode, generated by a second backup mode selection logic, one of:
the first backup actuator control command and the check value for the first backup actuator control command; and
the second backup actuator control command and the check value for the second backup actuator control command.

15. The method of claim 14 further comprising:

generating a backup power control command by the backup controller in response to the operational mode indication generated by the first backup mode selection logic indicating the backup mode; and sending the backup power control command to the power controller as a power control command in response to the operational mode indication generated by the second backup mode selection logic indicating the backup mode.

16. The method of claim 14 further comprising:

sending the command message from the command lane and the check value from the monitor lane to the backup controller in response to the operational mode indication generated by the second backup mode selection logic indicating the primary mode.

17. The method of claim 10 further comprising:

receiving reporting data from the actuator controller by the command lane;

receiving the reporting data from the actuator controller by the monitor lane;

generating a reporting message check value for the reporting data by the monitor lane;

combining the reporting data from the command lane and the reporting message check value from the monitor lane to form a reporting message comprising the reporting data and the reporting message check value; and sending the reporting message to the primary controller.

18. The method of claim 10, wherein the primary controller comprises a flight controller for an aircraft and the actuator is configured to move a flight control surface for the aircraft in response to control signals generated by the actuator controller.

19. A method of controlling an actuator in a flight control system, the method comprising:

blocking malfunction effects from reaching the actuator via:
receiving, from a command combiner within an interface communicating with a primary controller, an actuator control command message comprising:
a first selected number of commands from a command lane; and
a check value, generated by a monitor lane, for the first selected number of commands;
determining validity of the actuator control command message using the first selected number of commands from the command lane, the check value from the monitor lane, and a check value generated by a validator within an actuator controller; and
responding to a validity determination for the actuator control command message via controlling the actuator as indicated by the first selected number of commands.

20. The method of claim 19 further comprising:

the malfunction effects comprising malfunctions corrupting data paths and power control paths to and from the actuator;

generating reporting data;

generating a check value for the reporting data; and sending the reporting data and the check value for the reporting data to both the command lane and the monitor lane.

* * * * *